United States Patent
Seyama

(10) Patent No.: US 8,457,229 B2
(45) Date of Patent: Jun. 4, 2013

(54) RADIO COMMUNICATION APPARATUS AND ERROR CORRECTING METHOD

(75) Inventor: Takashi Seyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 374 days.

(21) Appl. No.: 12/893,849

(22) Filed: Sep. 29, 2010

(65) Prior Publication Data

US 2011/0075770 A1     Mar. 31, 2011

(30) Foreign Application Priority Data

Sep. 30, 2009  (JP) ................................ 2009-228841

(51) Int. Cl.
*H04L 5/12*       (2006.01)

(52) U.S. Cl.
USPC ........... 375/262; 375/348; 375/349; 714/774; 714/780; 714/794

(58) Field of Classification Search
USPC .. 375/261, 262, 265, 340, 348, 349; 370/252, 370/464, 465; 714/746, 751, 760, 774, 780, 714/794, 795
See application file for complete search history.

(56) References Cited

U.S. PATENT DOCUMENTS

| 2005/0054319 | A1* | 3/2005 | Tamaki et al. ................ 455/296 |
| 2007/0110191 | A1  | 5/2007 | Kim et al. |
| 2008/0043864 | A1* | 2/2008 | Fujii ............................. 375/260 |
| 2009/0161786 | A1* | 6/2009 | Nakagawa et al. ........... 375/286 |
| 2009/0310695 | A1* | 12/2009 | Sawai ........................... 375/262 |
| 2009/0323846 | A1* | 12/2009 | Sindhushayana ............. 375/262 |

FOREIGN PATENT DOCUMENTS

| JP | 2004-104188 A | 4/2004 |
| JP | 2009-513087 A | 3/2009 |

* cited by examiner

*Primary Examiner* — Dac Ha
(74) *Attorney, Agent, or Firm* — Fujitsu Patent Center

(57) ABSTRACT

A radio communication apparatus includes a receiving unit configured to receive signals, an obtaining unit configured to obtain a reference amplitude that depends on a modulation scheme for a received signal received by the receiving unit, and on amplitude fluctuations of the received signal in a propagation path, a demodulating unit configured to demodulate the received signal to obtain an in-phase component and a quadrature component of each received symbol included in the received signal, a calculating unit configured to calculate a likelihood ratio for each of bits mapped to each received symbol using the reference amplitude and the in-phase or quadrature component, and a decoding unit configured to perform error correction decoding on the received signal using the calculated likelihood ratios.

13 Claims, 22 Drawing Sheets

FIG.22

```
for(i=0; i<N; i++){
    if(r_re[i]<-6*K[i]){
        llr = 8*K[i]*(r_re[i]+3*K[i]);
    }else if(r_re[i]>=-6*K[i] && r_re[i]<-4*K[i]){
        llr = 6*K[i]*(r_re[i]+2*K[i]);
    }else if(r_re[i]>=-4*K[i] && r_re[i]<-2*K[i]){
        llr = 4*K[i]*(r_re[i]+K[i]);
    }else if(r_re[i]>=-2*K[i] && r_re[i]<2*K[i]){
        llr = 2*K[i]*r_re[i];
    }else if(r_re[i]>=2*K[i] && r_re[i]<-4*K[i]){
        llr = 4*K[i]*(r_re[i]-K[i]);
    }else if(r_re[i]>=4*K[i] && r_re[i]<6*K[i]){
        llr = 6*K[i]*(r_re[i]-2*K[i]);
    } else if(r_re[i]>=6*K[i]){
        llr = 8*K[i]*(r_re[i]-3*K[i]);
    }
}
```

RADIO COMMUNICATION APPARATUS AND ERROR CORRECTING METHOD

CROSS-REFERENCE TO RELATED APPLICATIONS

This application is based upon and claims the benefit of priority of the prior Japanese Patent Application No. 2009-228841, filed on Sep. 30, 2009, the entire contents of which are incorporated herein by reference.

FIELD

The present embodiments discussed herein are related to radio communication apparatuses and error correcting methods.

BACKGROUND

In Wideband-code Division Multiple Access (W-CDMA) systems and Long Term Evolution (LTE) systems that have been standardized in the 3rd Generation Partnership Project (3GPP) in recent years, turbo codes are used as error correcting codes. In error correction that involves use of turbo codes, a Log Likelihood Ratio (hereinafter may also be referred to as an "LLR") for each bit is calculated, from a received symbol, as soft decision information. Iterative decoding using the obtained soft decision information makes it possible to achieve performance that is close to the Shannon limit.

An LLR for each bit is a logarithm of a ratio of likelihood that a bit value of the bit is "0" to likelihood that it is "1". A log likelihood ratio $LLR_i$ for the i-th bit (i is an integer greater than or equal to 1) in a received symbol r may be expressed by equation (1) below:

$$
\begin{aligned}
LLR_i &= \log\left\{\frac{\sum_{s\in s(b_i=0)} P(s|r)}{\sum_{s\in s(b_i=1)} P(s|r)}\right\} \quad (1)\\
&= \log\left\{\frac{\sum_{s\in s(b_i=0)} P(r|s)P(s)}{\sum_{s\in s(b_i=1)} P(r|s)P(s)}\right\}\\
&= \log\left\{\frac{\sum_{s\in s(b_i=0)} P(r|s)}{\sum_{s\in s(b_i=1)} P(r|s)}\right\}\\
&= \log\left\{\sum_{s\in s(b_i=0)} \frac{1}{\sqrt{2\pi\sigma^2}}\exp\left\{-\frac{(r-s)^2}{2\sigma^2}\right\}\right\} -\\
&\quad \log\left\{\sum_{s\in s(b_i=1)} \frac{1}{\sqrt{2\pi\sigma^2}}\exp\left\{-\frac{(r-s)^2}{2\sigma^2}\right\}\right\}\\
&= \min_{s\in s(b_i=0)}\left[-\frac{(r-s)^2}{2\sigma^2}\right] - \min_{s\in s(b_i=1)}\left[-\frac{(r-s)^2}{2\sigma^2}\right]\\
&= -\frac{1}{2\sigma^2}(d_{0,min}^2 - d_{1,min}^2)
\end{aligned}
$$

Equation (1) uses the Bayes' theorem, assumes that occurrence probabilities of all transmitted symbols are the same, and is transformed using the relationship of the following equation (2). In other words, the log likelihood ratio $LLR_i$ is expressed using variance σ and minimum distances $d_{0,min}$ and $d_{1,min}$ between constellation points in an IQ plane:

$$\log\left(\sum_i \exp(-x_i)\right) \approx -\min(x_i) \quad (2)$$

As may be seen from equation (1), the log likelihood ratio $LLR_i$ is expressed using the minimum distance $d_{0,min}$ between the received symbol r and a constellation point corresponding to a bit having a bit value of "0", and the minimum distance $d_{1,min}$ between the received symbol r and a constellation point corresponding to a bit having a bit value of "1" in the IQ plane. Specifically, for example, when quadrature phase shift keying (QPSK) is used as a modulation scheme, two-bit sets "00", "01", "10", and "11" are assigned to four points (K, K), (K, -K), (-K, K), and (-K, -K) in the IQ plane, respectively, where K is a reference amplitude value obtained from a coefficient depending on the modulation scheme and a channel estimate. A description will be given of an LLR for the first bit when the received symbol r are at the position marked with a star in FIG. 19.

Constellation points whose first bits have a bit value of "0" are (K, K) and (K, -K) corresponding to "00" and "01", respectively. A constellation point closest to the received symbol r is (K, K) corresponding to "00". Therefore, the minimum distance $d_{0,min}$ is the Euclidean distance between the received symbol r and (K, K). Similarly, the minimum distance $d_{1,min}$ between a constellation point whose first bit has a bit value of "1" and the received symbol r is the Euclidean distance between the received symbol r and (-K, K). Thus, the LLR for the first bit of the received symbol r may be determined from the minimum distances $d_{0,min}$ and $d_{1,min}$ illustrated in FIG. 19.

As may be seen from FIG. 19, each bit is independently mapped to an in-phase component (hereinafter referred to as an "I component") or to a quadrature component (hereinafter referred to as a "Q component") so that the first bit is mapped to the I component and the second bit is mapped to the Q component. Therefore, for each bit, the attention may be focused on the I or Q component of the received symbol r to determine the LLR from the minimum distance in a one-dimensional space. That is, when the I component of the received symbol r is a real part Re(r) and the Q component of the received symbol r is an imaginary part Im(r), LLRs for the first and second bits may be expressed by equations (3) below:

$$
\begin{cases}
LLR_1 = -\dfrac{1}{2\sigma^2}[(K - \mathrm{Re}(r))^2 - (-K - \mathrm{Re}(r))^2] \\
\quad = \dfrac{2K\,\mathrm{Re}(r)}{\sigma^2} \\
LLR_2 = -\dfrac{1}{2\sigma^2}[(K - \mathrm{Im}(r))^2 - (-K - \mathrm{Im}(r))^2] \\
\quad = \dfrac{2K\,\mathrm{Im}(r)}{\sigma^2}
\end{cases}
\quad (3)
$$

Similarly, when 16 quadrature amplitude modulation (16QAM) is used as a modulation scheme, four bits mapped to one symbol are also independently mapped to the I and Q components. Therefore, an LLR for each bit may be determined from the minimum distance in a one-dimensional space. In 16QAM, however, there are two constellation points having a bit value of "0" and two constellation points having a bit value of "1" in a one-dimensional coordinate system. Therefore, depending on the region where the received symbol r is located, the constellation points which give the minimum distances $d_{0,min}$ and $d_{1,min}$ are different.

Specifically, for example, as illustrated in FIG. 20, for the first bit in a 16QAM constellation, the coordinates of constellation points having a bit value of "0" are K and 3K, and the coordinates of constellation points having a bit value of "1" are −K and −3K. Therefore, a combination of constellation points closest to the received symbol r depends on which of regions 1-1, 1-2 and 1-3 the received symbol r is located. When the received symbol r is included in the region 1-1, of the two constellation points having a bit value of "0", the one at the coordinate K is closest to the received symbol r; and of the two constellation points having a bit value of "1", the one at the coordinate −3K is closest to the received symbol. That is, a combination of the constellation points at the coordinates K and −3K gives the minimum distances $d_{0,min}$ and $d_{1,min}$. Similarly, when the received symbol r is included in the region 1-2, a combination of the constellation points at the coordinates K and −K gives the minimum distances $d_{0,min}$ and $d_{1,min}$. Also, when the received symbol r is included in the region 1-3, a combination of the constellation points at the coordinates 3K and −K gives the minimum distances $d_{0,min}$ and $d_{1,min}$.

As described above, depending on the region to which the received symbol r belongs, the constellation points that give the minimum distances are different. Therefore, a log likelihood ratio $LLR_i$ for the first bit in 16QAM may be determined for each region from equation (4) below by using the I component (i.e., the real part Re(r)) of the received symbol r:

$$LLR_1 = \begin{cases} \frac{4K\{Re(r)+K\}}{\sigma^2}, & Re(r) < -2K \\ \frac{2K\,Re(r)}{\sigma^2}, & -2K \le Re(r) < 2K \\ \frac{4K\{Re(r)-K\}}{\sigma^2}, & 2K \le Re(r) \end{cases} \quad (4)$$

Since the second bit in 16QAM is mapped to the Q component of the received symbol r, a log likelihood ratio $LLR_2$ may be determined for each region from equation (5) below by using the Q component (i.e., the imaginary part Im(r)) of the received symbol r:

$$LLR_2 = \begin{cases} \frac{4K\{Im(r)+K\}}{\sigma^2}, & Im(r) < -2K \\ \frac{2K\,Im(r)}{\sigma^2}, & -2K \le Im(r) < 2K \\ \frac{4K\{Im(r)-K\}}{\sigma^2}, & 2K \le Im(r) \end{cases} \quad (5)$$

On the other hand, as illustrated in FIG. 21, for the third bit in the 16QAM constellation, the coordinates of constellation points having a bit value of "0" are −K and K, and the coordinates of constellation points having a bit value of "1" are −3K and 3K. Therefore, a combination of constellation points closest to the received symbol r depends on which of regions 3-1 and 3-2 the received symbol is located. When the received symbol r is included in the region 3-1, a combination of the constellation points at the coordinates −K and −3K gives the minimum distances. When the received symbol r is included in the region 3-2, a combination of the constellation points at the coordinates K and 3K gives the minimum distances.

Therefore, in 16QAM, a log likelihood ratio $LLR_3$ for the third bit may be determined from equation (6) below, and a log likelihood ratio $LLR_4$ for the fourth bit mapped to the Q component may be determined from equation (7) below:

$$LLR_3 = \begin{cases} \frac{2K\{Re(r)+2K\}}{\sigma^2}, & Re(r) < 0 \\ -\frac{2K\{Re(r)-2K\}}{\sigma^2}, & 0 \le Re(r) \end{cases} \quad (6)$$

$$LLR_4 = \begin{cases} \frac{2K\{Im(r)+2K\}}{\sigma^2}, & Im(r) < 0 \\ -\frac{2K\{Im(r)-2K\}}{\sigma^2}, & 0 \le Im(r) \end{cases} \quad (7)$$

When 64QAM is used as a modulation scheme, an LLR for each bit may be determined for each region to which the received symbol r belongs. Log likelihood ratios $LLR_1$, $LLR_3$, and $LLR_5$ for the first, third, and fifth bits, respectively, may be determined by equations (8) to (10) below:

$$LLR_1 = \begin{cases} \frac{8K\{Re(r)+3K\}}{\sigma^2}, & Re(r) < -6K \\ \frac{6K\{Re(r)+2K\}}{\sigma^2}, & -6K \le Re(r) < -4K \\ \frac{4K\{Re(r)+K\}}{\sigma^2}, & -4K \le Re(r) < -2K \\ \frac{2K\,Re(r)}{\sigma^2}, & -2K \le Re(r) < 2K \\ \frac{4K\{Re(r)-K\}}{\sigma^2}, & 2K \le Re(r) < 4K \\ \frac{6K\{Re(r)-2K\}}{\sigma^2}, & 4K \le Re(r) < 6K \\ \frac{8K\{Re(r)-3K\}}{\sigma^2}, & 6K \le Re(r) \end{cases} \quad (8)$$

$$LLR_3 = \begin{cases} \frac{4K\{Re(r)+5K\}}{\sigma^2}, & Re(r) < -6K \\ \frac{2K\{Re(r)+4K\}}{\sigma^2}, & -6K \le Re(r) < -2K \\ \frac{4K\{Re(r)+3K\}}{\sigma^2}, & -2K \le Re(r) < 0 \\ \frac{4K\{-Re(r)+3K\}}{\sigma^2}, & 0 \le Re(r) < 2K \\ \frac{2K\{-Re(r)+4K\}}{\sigma^2}, & 2K \le Re(r) < 6K \\ \frac{4K\{-Re(r)+5K\}}{\sigma^2}, & 6K < Re(r) \end{cases} \quad (9)$$

$$LLR_5 = \begin{cases} \frac{2K\{Re(r)+6K\}}{\sigma^2}, & Re(r) < -4K \\ \frac{2K\{-Re(r)-2K\}}{\sigma^2}, & -4K \le Re(r) < 0 \\ \frac{2K\{Re(r)-2K\}}{\sigma^2}, & 0 \le Re(r) < 4K \\ \frac{2K\{-Re(r)+6K\}}{\sigma^2}, & -4K \le Re(r) \end{cases} \quad (10)$$

Thus, in each modulation scheme, by determining the region to which the received symbol r belongs, an LLR for each bit may be calculated depending on the region. The calculated LLR for each bit is used as soft decision information to perform error correction decoding, for example, turbo decoding. Examples of the related art are disclosed in Japanese Laid-open Patent Publication No. 2009-513087 and Japanese Laid-open Patent Publication No. 2004-104188.

The LLR calculation method described above involves a region determination for each received symbol. This increases the number of determination steps and may cause processing delays. In particular, in high-speed communication, where a large number of received symbols are processed per unit time, it is more likely that larger processing delays may occur.

Specifically, for example, to calculate the LLR for the first bit in 16QAM, a determination is made for each received symbol r as to which of the regions 1-1 to 1-3 is the one to which the received symbol r belongs, and then an operation is performed in accordance with the determination. Also, for example, for the first bit in 64QAM, the LLR may not be calculated without determining, for each received symbol r, which of seven regions is the one to which the received symbol r belongs. Therefore, when the transmission speed increases, the determination processing may not keep up with the speed of receiving symbols and processing delays may occur.

In recent years, Software Defined Radio (SDR) in which signal processing is implemented by software has been widespread. Since execution of the above-described LLR calculations involves many comparison instructions and branch instructions for region determinations, an improvement in processing speed is limited. Specifically, for example, an algorithm for calculating the LLR for the first bit in 64QAM involves sequential comparisons as illustrated in FIG. 22. Compiling this algorithm generates many comparison instructions and branch instructions. To process comparison and branch instructions, some processors require cycles as many as the number of cycles required for processing Arithmetic Logic Unit (ALU) instructions for four arithmetic operations. This leads to increased processing time and may result in processing delays in the SDR.

The SDR allows parallel execution of instructions or operations. However, since the algorithm described above involves sequential comparisons, it may be difficult to improve efficiency through parallel processing. That is, since it may be necessary to sequentially determine whether the received symbol r belongs to each region, it is difficult to fully exploit the performance of architectures, such as Very Long Instruction Word (VLIW) and Single Instruction Multiple Data (SIMD), which allow parallel execution of instructions or operations.

SUMMARY

According to an aspect of the invention, a radio communication apparatus includes a receiving unit configured to receive signals, an obtaining unit configured to obtain a reference amplitude that depends on a modulation scheme for a received signal received by the receiving unit, and on amplitude fluctuations of the received signal in a propagation path, a demodulating unit configured to demodulate the received signal to obtain an in-phase component and a quadrature component of each received symbol included in the received signal, a calculating unit configured to calculate a likelihood ratio for each of bits mapped to each received symbol using the reference amplitude and the in-phase or quadrature component, and a decoding unit configured to perform error correction decoding on the received signal using the calculated likelihood ratios.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 22 illustrates an example algorithm for calculating a bit log likelihood ratio.

DESCRIPTION OF EMBODIMENTS

Embodiments of a radio communication apparatus, an error correcting method, and an error correcting program disclosed in the present application will now be described in detail with reference to the drawings. Note that the present invention is not limited to the embodiments described below.

First Embodiment

Figure 1:
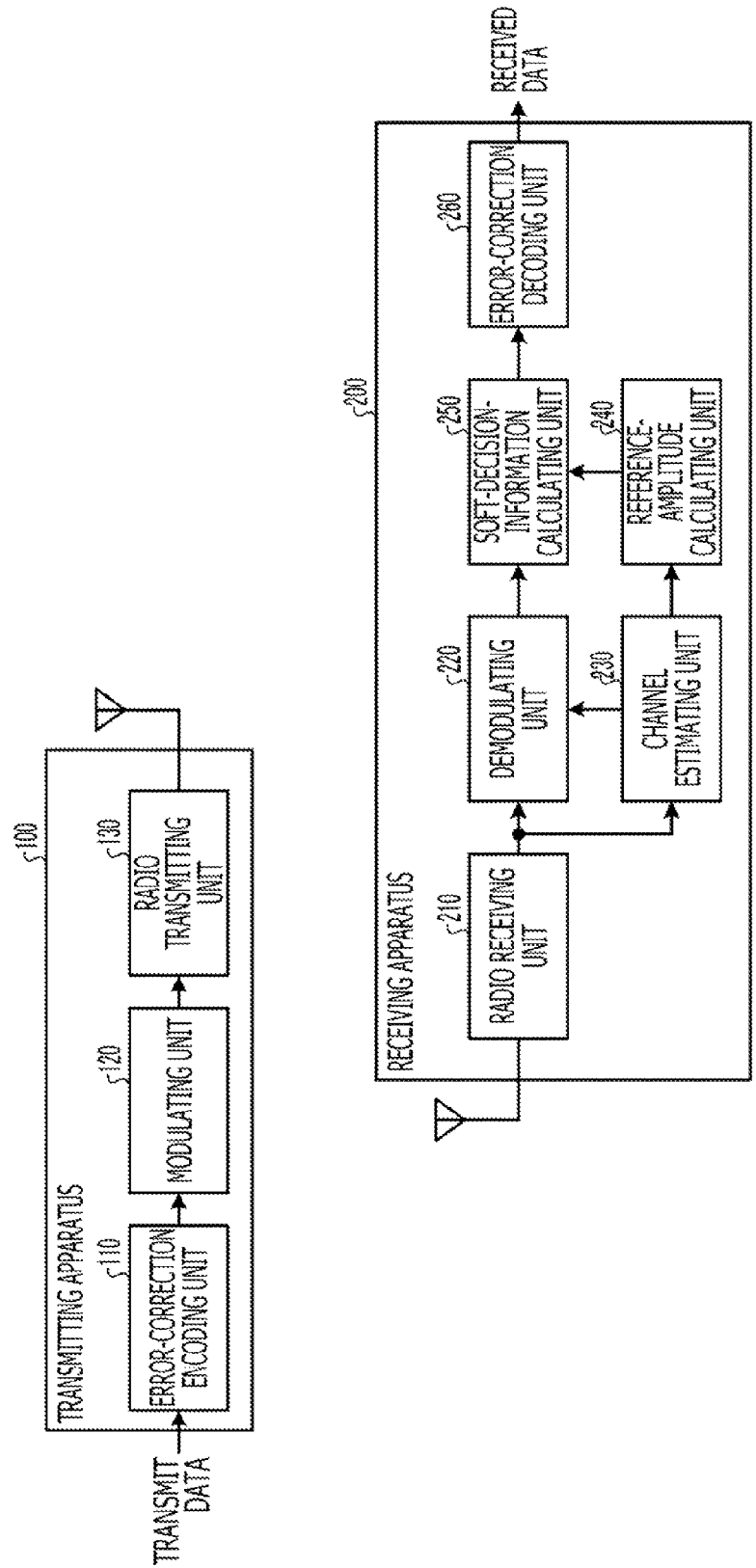
FIG. 1 illustrates a configuration of a communication system according to a first embodiment.

FIG. 1 illustrates a configuration of a communication system according to a first embodiment. As illustrated in FIG. 1, in the communication system of the present embodiment, a transmitting apparatus 100 and a receiving apparatus 200 perform radio communication. Specifically, the transmitting apparatus 100 includes an error-correction encoding unit 110, a modulating unit 120, and a radio transmitting unit 130. The receiving apparatus 200 includes a radio receiving unit 210, a demodulating unit 220, a channel estimating unit 230, a reference-amplitude calculating unit 240, a soft-decision-information calculating unit 250, and an error-correction decoding unit 260.

The error-correction encoding unit 110 performs error correction encoding on transmit data and outputs the resulting encoded data to the modulating unit 120. The error-correction encoding unit 110 uses error correcting codes, for example, turbo codes, convolutional codes, or Low Density Parity Check (LDPC) codes, to perform error correction encoding. That is, the error-correction encoding unit 110 performs error correction encoding on transmit data with an error correction encoding method in which LLRs are used as soft decision information at the time of decoding.

Figure 2:
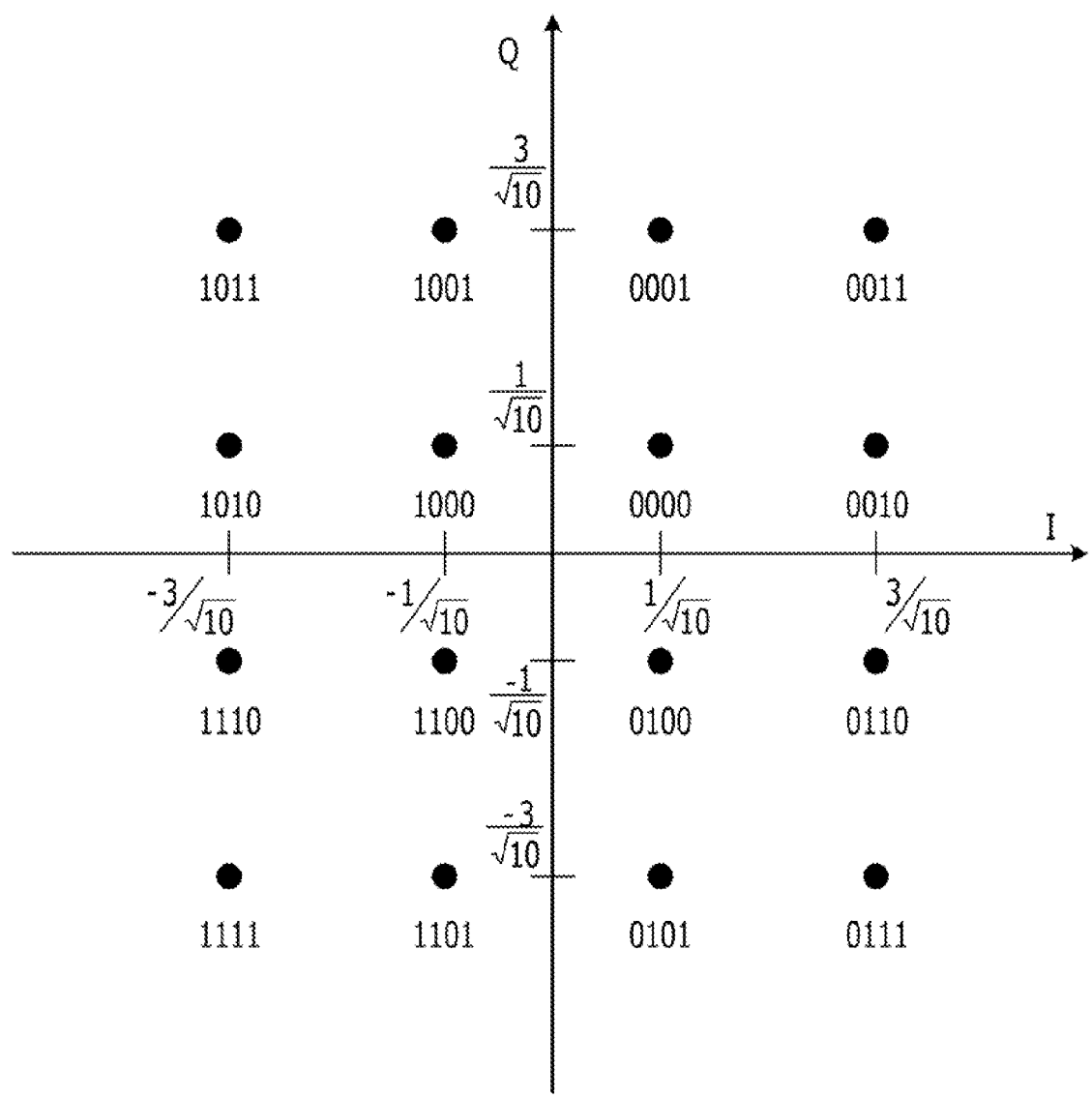
FIG. 2 illustrates a 16QAM constellation.

The modulating unit 120 modulates the encoded data output from the error-correction encoding unit 110, and outputs the resulting modulated data to the radio transmitting unit 130. In the present embodiment, the modulating unit 120 modulates the encoded data in accordance with 16QAM. That is, as illustrated in FIG. 2, the modulating unit 120 maps four bits of encoded data to each constellation point. As illustrated in FIG. 2, the first bits of respective constellation points whose I components are positive have a bit value of "0", and the first bits of respective constellation points whose I components are negative have a bit value of "1". Similarly, the second bits of respective constellation points whose Q components are positive have a bit value of "0", and the second bits of respective constellation points whose Q components are negative have a bit value of "1".

The third bits of respective constellation points in two columns close to the Q axis have a bit value of "0", and the third bits of respective constellation points in two columns far from the Q axis have a bit value of "1". Similarly, the fourth bits of respective constellation points in two rows close to the I axis have a bit value of "0", and the fourth bits of respective constellation points in two rows far from the I axis have a bit value of "1". Thus, each bit, which is independently mapped to the I or Q component, may be treated in a one-dimensional coordinate system.

The radio transmitting unit 130 performs certain radio transmitting processing (e.g., digital-to-analog (D/A) conversion and upconversion) on the modulated data output from the modulating unit 120, and transmits the resulting radio signal through an antenna. The transmitted radio signal is subjected to phase and amplitude fluctuations in a propagation path and received by the receiving apparatus 200.

The radio receiving unit 210 receives the radio signal through an antenna and performs certain radio receiving processing (e.g., downconversion and analog-to-digital (A/D) conversion) on the received signal. The radio receiving unit 210 outputs the received signal to the demodulating unit 220 and the channel estimating unit 230.

The demodulating unit 220 demodulates the received signal using a result of channel estimation performed by the channel estimating unit 230. Then, the demodulating unit 220 outputs the resulting demodulated data to the soft-decision-information calculating unit 250. Specifically, as the demodulated data, the demodulating unit 220 outputs the I and Q components of each received symbol included in the received signal to the soft-decision-information calculating unit 250. As described above, the modulating unit 120 of the transmitting apparatus 100 maps the encoded data to any of the constellation points illustrated in FIG. 2. However, due to phase and amplitude fluctuations in the propagation path, the received symbol is displaced from the position of the constellation point to which the encoded data is mapped.

The channel estimating unit 230 performs channel estimation on the received signal to determine a channel estimate corresponding to the phase and amplitude fluctuations in the propagation path. Then, the channel estimating unit 230 outputs the determined channel estimate to the demodulating unit 220 and the reference-amplitude calculating unit 240.

The reference-amplitude calculating unit 240 calculates a reference amplitude from the channel estimate and a coefficient depending on the modulation scheme. Then, the reference-amplitude calculating unit 240 outputs the resulting reference amplitude to the soft-decision-information calculating unit 250. In the present embodiment, where the modulation scheme is 16QAM, a coefficient β used by the reference-amplitude calculating unit 240 in calculating the reference amplitude may be expressed by equation (11) below:

$$\beta = 1/\sqrt{10} \quad (11)$$

The soft-decision-information calculating unit 250 calculates a Log Likelihood Ratio (LLR) for each bit from the reference amplitude output from the reference-amplitude calculating unit 240 and the I and Q components of the received symbol, the I and Q components being output from the demodulating unit 220. Here, the soft-decision-information calculating unit 250 applies a single operation expression to each bit mapped to the received symbol, so as to calculate an LLR for the bit. That is, regardless of the region to which the received symbol belongs in the IQ plane, the soft-decision-information calculating unit 250 calculates an LLR for each bit in a uniform way using a single operation expression including an absolute value operation. The LLR calculation performed by the soft-decision-information calculating unit 250 will be described in detail later on.

The error-correction decoding unit 260 performs error correction decoding using LLRs calculated for respective bits by the soft-decision-information calculating unit 250. Then, the error-correction decoding unit 260 outputs the error-corrected received data. For example, when turbo codes are used as error correcting codes, the error-correction decoding unit 260 performs iterative decoding using LLRs calculated by the soft-decision-information calculating unit 250.

Figure 3:
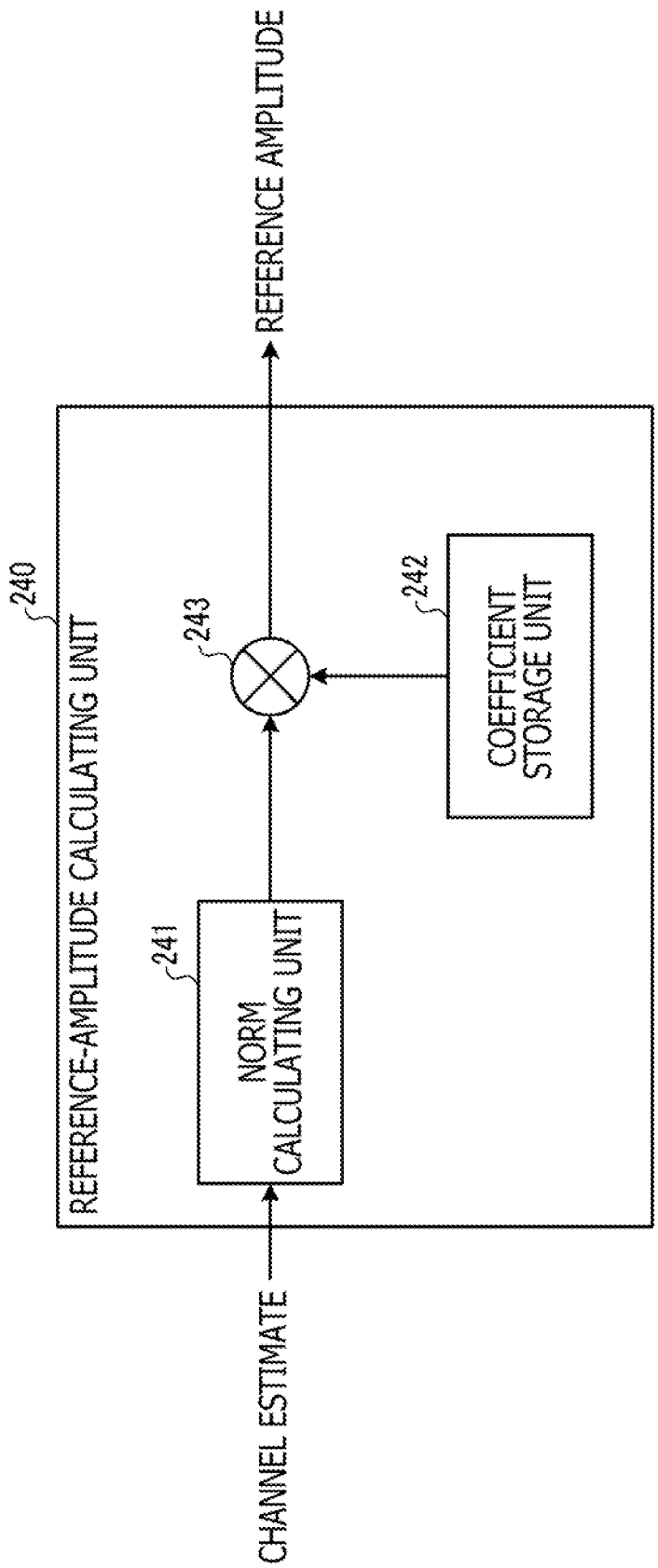
FIG. 3 illustrates a configuration of a reference-amplitude calculating unit according to the first embodiment.

FIG. 3 is a block diagram illustrating a configuration of the reference-amplitude calculating unit 240 according to the present embodiment. As illustrated in FIG. 3, the reference-amplitude calculating unit 240 includes a norm calculating unit 241, a coefficient storage unit 242, and a multiplier 243.

The norm calculating unit 241 calculates a norm of the channel estimate output from the channel estimating unit 230. Specifically, the norm calculating unit 241 calculates the square of the channel estimate as a norm and outputs the norm to the multiplier 243.

The coefficient storage unit 242 stores the coefficient β depending on the modulation scheme in advance, and outputs the stored coefficient β to the multiplier 243. In the present embodiment, where the modulation scheme is 16QAM, the coefficient β stored by the coefficient storage unit 242 may be expressed by equation (11) above.

The multiplier 243 calculates a reference amplitude by multiplying the norm output from the norm calculating unit 241 by the coefficient β output from the coefficient storage unit 242. That is, the reference amplitude calculated by the multiplier 243 represents an amplitude that may be obtained after an amplitude serving as a reference for a constellation depending on the modulation scheme is subjected to amplitude fluctuations in the propagation path. The reference amplitude corresponds to a gain in the propagation path.

Figure 4:
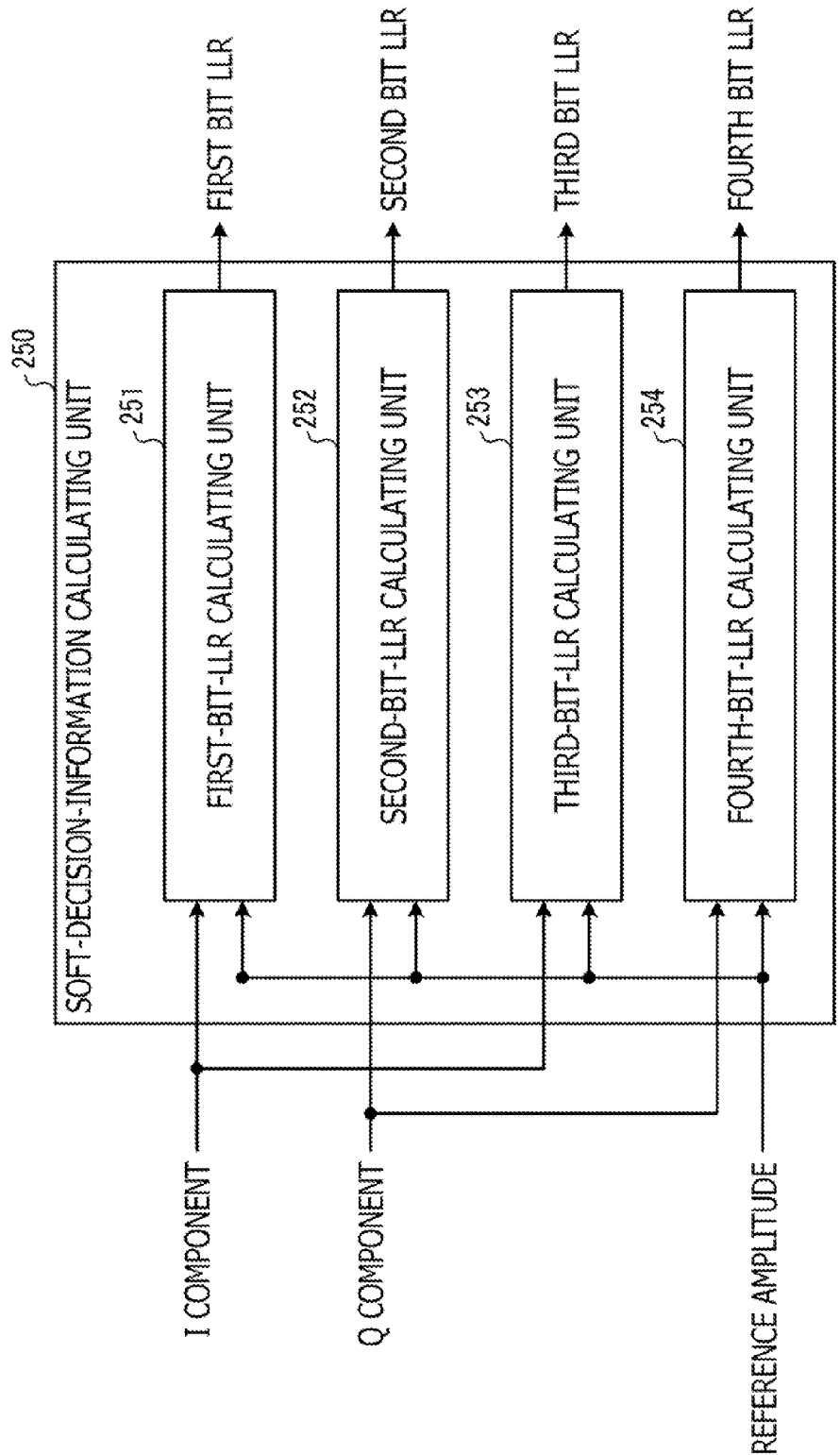
FIG. 4 illustrates a configuration of a soft-decision-information calculating unit according to the first embodiment.

FIG. 4 is a block diagram illustrating a configuration of the soft-decision-information calculating unit 250 according to the present embodiment. As illustrated in FIG. 4, the soft-decision-information calculating unit 250 includes a first-bit-LLR calculating unit 251, a second-bit-LLR calculating unit 252, a third-bit-LLR calculating unit 253, and a fourth-bit-LLR calculating unit 254.

The first-bit-LLR calculating unit 251 performs an operation, including an absolute value operation, on the I component of the received symbol, the I component being output from the demodulating unit 220, and the reference amplitude output from the reference-amplitude calculating unit 240, so as to calculate an LLR for the first bit of the received symbol (hereinafter referred to as a "first bit LLR").

The second-bit-LLR calculating unit 252 performs an operation, including an absolute value operation, on the Q component of the received symbol, the Q component being output from the demodulating unit 220, and the reference amplitude output from the reference-amplitude calculating unit 240, so as to calculate an LLR for the second bit of the received symbol (hereinafter referred to as a "second bit LLR").

The third-bit-LLR calculating unit 253 performs an operation, including an absolute value operation, on the I component of the received symbol, the I component being output from the demodulating unit 220, and the reference amplitude output from the reference-amplitude calculating unit 240, so as to calculate an LLR for the third bit of the received symbol (hereinafter referred to as a "third bit LLR").

The fourth-bit-LLR calculating unit 254 performs an operation, including an absolute value operation, on the Q component of the received symbol, the Q component being output from the demodulating unit 220, and the reference amplitude output from the reference-amplitude calculating unit 240, so as to calculate an LLR for the fourth bit of the received symbol (hereinafter referred to as a "fourth bit LLR").

The first to fourth-bit-LLR calculating units 251 to 254 each uses one operation expression to calculate an LLR. That is, without performing a region determination for the received symbol, each of the first to fourth-bit-LLR calculating units 251 to 254 inputs the I component (i.e., the real part of the received symbol) or the Q component (i.e., the imaginary part of the received symbol) and the reference amplitude into one operation expression to output an LLR. Hereinafter, operation expressions the first to fourth-bit-LLR calculating units 251 to 254 use to calculate respective LLRs will be described. Since the operation expressions for the first bit LLR and the second bit LLR are the same except that the input is the I or Q component, the operation expression for the first bit LLR only will be described here. Similarly, since the operation expressions for the third bit LLR and the fourth bit LLR are the same except that the input is the I or Q component, the operation expression for the third bit LLR only will be described here.

Figure 5:
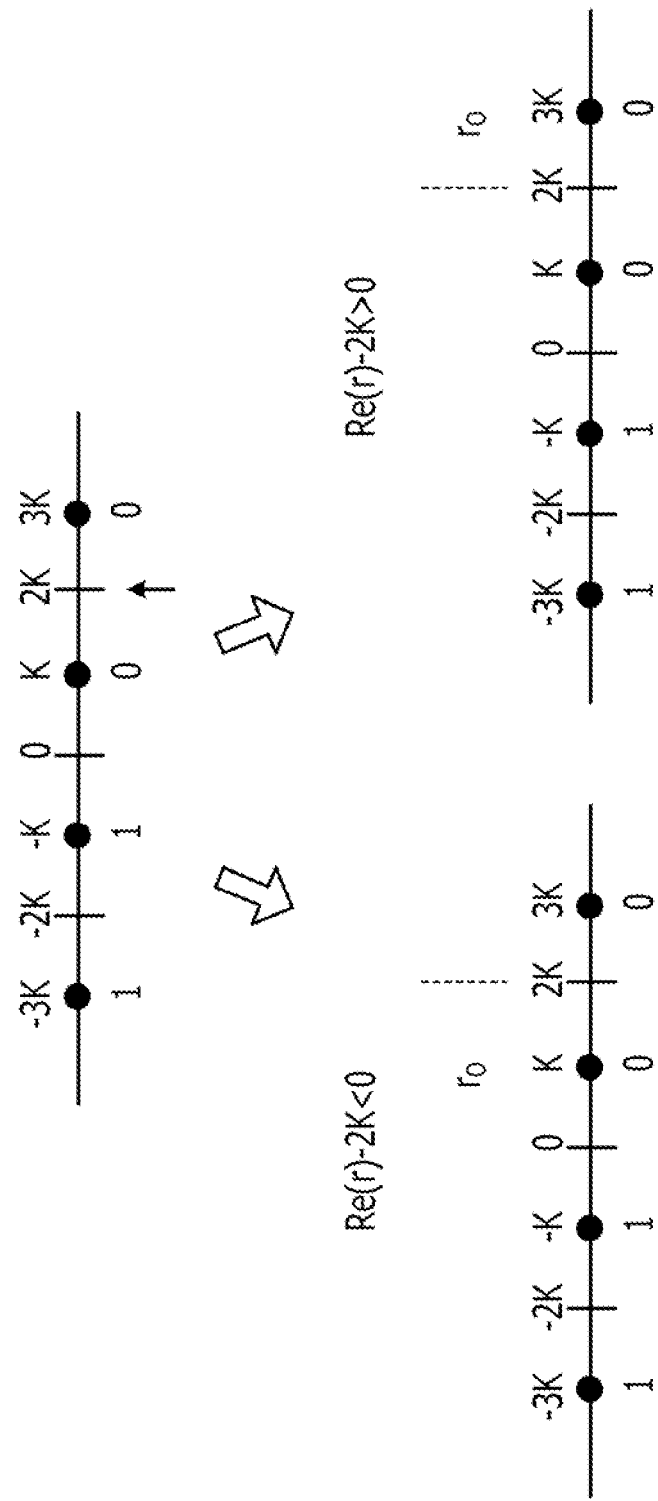
FIG. 5 is a diagram for explaining a first bit LLR according to the first embodiment.

For the first bits, as illustrated in FIG. 2, the bit values of constellation points in a region where I components are positive are "0". Therefore, of the constellation points whose first bits have a bit value of "0", a constellation point closest to the received symbol varies depending on the location of the received symbol. Specifically, as illustrated in FIG. 5, if the I component (i.e., the real part Re(r)) of the received symbol r is smaller than 2K, which is a reference coordinate, a constellation point at a coordinate K is a closest constellation point having a bit value of "0". If the I component of the received symbol r is greater than 2K, a constellation point at a coordinate 3K is a closest constellation point having a bit value of "0". In other words, depending on whether Re(r)−2K is negative or positive, a constellation point having a bit value of "0" and closest to the received symbol r is determined to be a constellation point at the coordinate K or 3K. A coordinate of a constellation point having a bit value of "0" and closest to the received symbol r may be expressed as 2K+Ksgn(Re(r)−2K), where sgn(x) is a function that returns a positive or negative sign of x.

Similarly, a coordinate of a constellation point having a bit value of "1" and closest to the received symbol r may be expressed as −2K−Ksgn(Re(r)+2K), where a coordinate −2K is a reference coordinate. Thus, a squared minimum distance between the received symbol r and its closest constellation point having a bit value of "0", and a squared minimum distance between the received symbol r and its closest constellation point having a bit value of "1" may be expressed by equations (12) below:

$$\begin{cases} d_{0,\min}^2 = \{(\text{Re}(r) - 2K) - K \cdot \text{sgn}(\text{Re}(r) - 2K)\}^2 \\ d_{1,\min}^2 = \{(\text{Re}(r) + 2K) - K \cdot \text{sgn}(\text{Re}(r) + 2K)\}^2 \end{cases} \quad (12)$$

A difference between these squared minimum distances may be expressed by equation (13) below. By substituting the resulting difference into equation (1), the first bit LLR may be calculated by equation (14) below:

$$\begin{aligned}
\overline{d} &= d_{0,\min}^2 - d_{1,\min}^2 \\
&= -8K\text{Re}(r) - 2K\{(\text{Re}(r) - 2K)\text{sgn}(\text{Re}(r) - 2K) - \\
&\quad (\text{Re}(r) + 2K)\text{sgn}(\text{Re}(r) + 2K)\} \\
&= -8K\text{Re}(r) - 2K\{|\text{Re}(r) - 2K| - |\text{Re}(r) + 2K|\}
\end{aligned} \quad (13)$$

$$LLR_1 = \frac{K\{4\text{Re}(r) + |\text{Re}(r) - 2K| - |\text{Re}(r) + 2K|\}}{\sigma^2} \quad (14)$$

Although equation (14) includes absolute value operations for Re(r)−2K and Re(r)+2K, the first bit LLR may be calculated uniformly by equation (14), regardless of the region to which the received symbol r belongs. That is, when equation (14) is used to calculate the first bit LLR, there is no need to make a region determination for the received symbol r.

Figure 6:
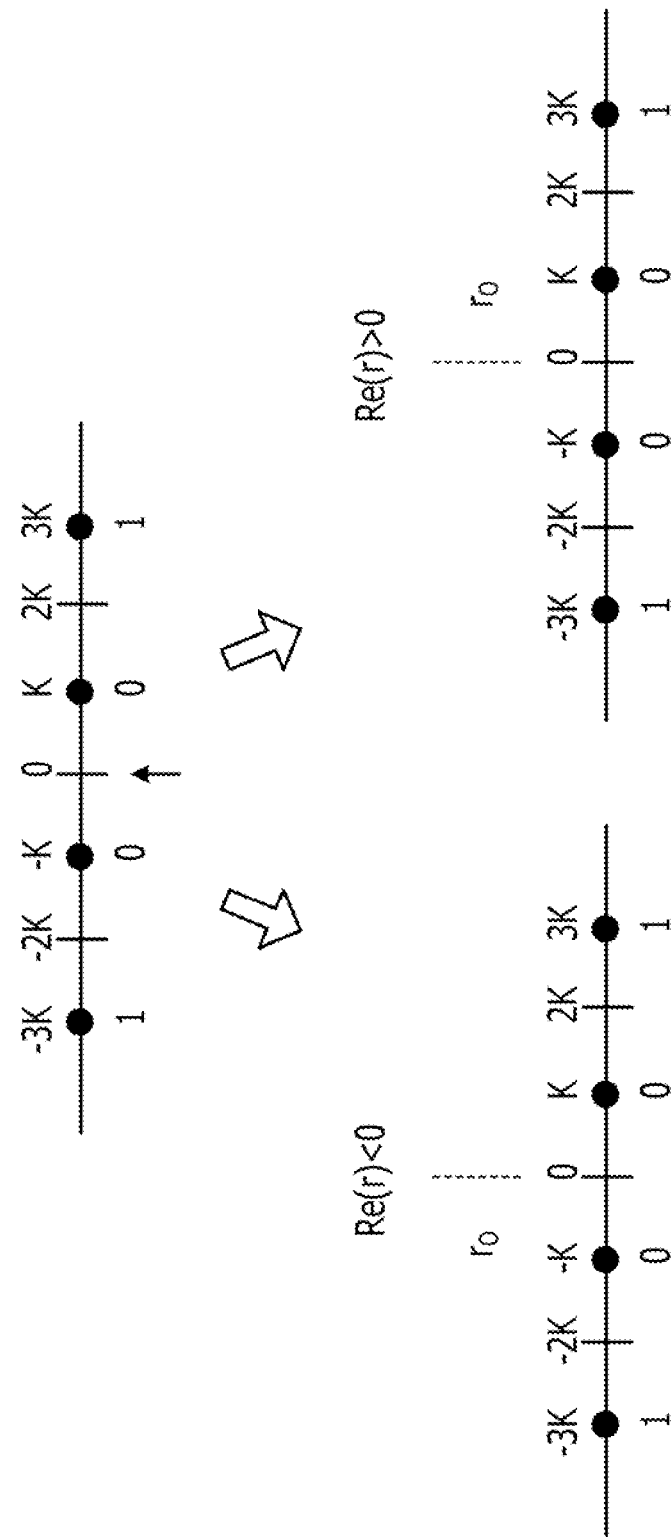
FIG. 6 is a diagram for explaining a third bit LLR according to the first embodiment.

As for the third bits, as illustrated in FIG. 2, the bit values of constellation points in two columns close to the Q axis are "0". Therefore, of the constellation points whose third bits have a bit value of "0", a constellation point closest to the received symbol varies depending on the location of the received symbol. Specifically, as illustrated in FIG. 6, if the I component (i.e., the real part Re(r)) of the received symbol r is smaller than a coordinate 0, which is a reference, a constellation point at a coordinate −K is a closest constellation point having a bit value of "0". If the I component of the received symbol r is greater than 0, a constellation point at a coordinate K is a closest constellation point having a bit value of "0". In other words, depending on whether Re(r) is negative or positive, a constellation point having a bit value of "0" and closest to the received symbol r is determined to be a constellation point at the coordinate −K or K. Therefore, a coordinate of a constellation point having a bit value of "0" and closest to the received symbol r may be expressed as Ksgn(Re(r)).

Similarly, a coordinate of a constellation point having a bit value of "1" and closest to the received symbol r may be expressed as 3Ksgn(Re(r)), where the coordinate 0 is a reference coordinate. Thus, a squared minimum distance between the received symbol r and its closest constellation point having a bit value of "0" and a squared minimum distance between the received symbol r and its closest constellation point having a bit value of "1" may be expressed by equations (15) below:

$$\begin{cases} d_{0,\min}^2 = \{(\text{Re}(r) - K\text{sgn}(\text{Re}(r)))\}^2 \\ d_{1,\min}^2 = \{(\text{Re}(r) - 3K\text{sgn}(\text{Re}(r)))\}^2 \end{cases} \quad (15)$$

By substituting a difference between these squared minimum distances into equation (1), the third bit LLR may be calculated by equation (16) below:

$$LLR_3 = \frac{2K(2K - |\text{Re}(r)|)}{\sigma^2} \quad (16)$$

Although equation (16) includes an absolute value operation for Re(r), the third bit LLR may be calculated uniformly by equation (16), regardless of the region to which the received symbol r belongs. That is, when equation (16) is used to calculate the third bit LLR, there is no need to make a region determination for the received symbol r. As described above, since the second and fourth bits are mapped to the Q component (i.e., imaginary part Im(r)), the second bit LLR and the fourth bit LLR may be calculated by equations (17) and (18), respectively, obtained by replacing Re(r) in equations (14) and (16) with Im(r):

$$LLR_2 = \frac{K\{4\text{Im}(r) + |\text{Im}(r) - 2K| - |\text{Im}(r) + 2K|\}}{\sigma^2} \quad (17)$$

$$LLR_4 = \frac{2K(2K - |\text{Im}(r)|)}{\sigma^2} \quad (18)$$

Again, although these equations include absolute value operations, there is no need to make a region determination for the received symbol r. Thus, each of the second bit LLR and the fourth bit LLR may be calculated in a uniform way.

As described above, each of the first to fourth bit LLRs is calculated uniformly by an operation expression including one or more absolute value operations. Thus, the first to fourth-bit-LLR calculating units 251 to 254 each inputs the I or Q component and the reference amplitude and calculate the first to fourth bit LLRs using equation (14), (17), (16), and (18), respectively.

Figure 7:
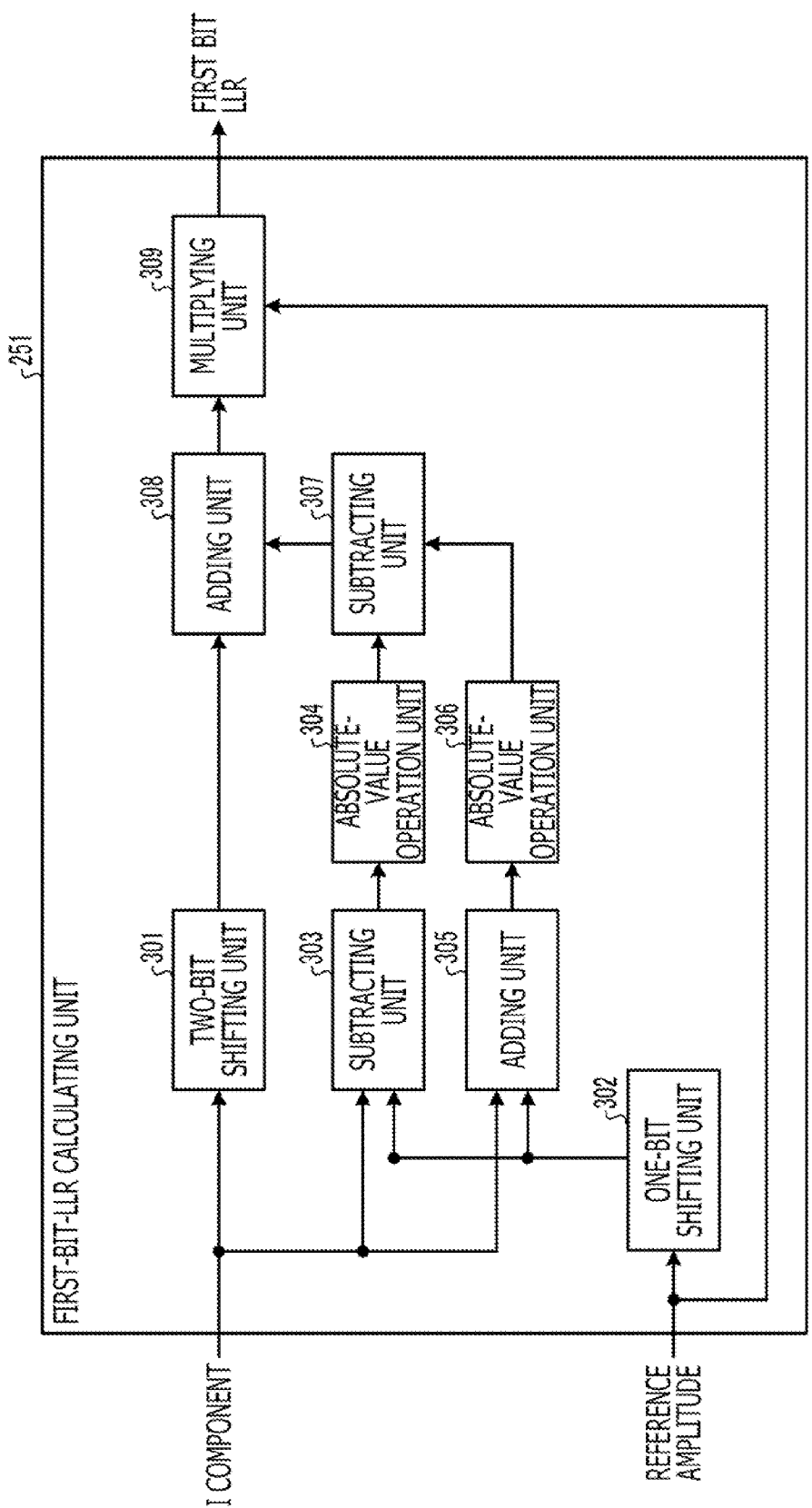
FIG. 7 illustrates a configuration of a first-bit-LLR calculating unit according to the first embodiment.

Specifically, for example, the first-bit-LLR calculating unit 251 is configured as illustrated in FIG. 7. That is, the first-bit-LLR calculating unit 251 includes a two-bit shifting unit 301, a one-bit shifting unit 302, a subtracting unit 303, an absolute-value operation unit 304, an adding unit 305, an absolute-value operation unit 306, a subtracting unit 307, an adding unit 308, and a multiplying unit 309.

The I component output from the demodulating unit 220 is input to the two-bit shifting unit 301, the subtracting unit 303, and the adding unit 305. The reference amplitude output from the reference-amplitude calculating unit 240 is input to the one-bit shifting unit 302 and the multiplying unit 309. The two-bit shifting unit 301 shifts the input by two bits in a fixed-point operation. This multiplies the I component by four to yield 4Re(r). The one-bit shifting unit 302 shifts the input by one bit to double the reference amplitude to 2K.

The subtracting unit 303 and the adding unit 305 perform the operations of Re(r)−2K and Re(r)+2K, respectively. The absolute-value operation units 304 and 306 calculate the absolute values of Re(r)−2K and Re(r)+2K, respectively. A difference between the calculated absolute values is calculated by the subtracting unit 307, and the resulting |Re(r)−2K|−|Re(r)+2K| is added by the adding unit 308 to 4Re(r) output from the two-bit shifting unit 301. The multiplying unit 309 multiplies the result of the addition performed by the adding unit 308 by K/σ² to calculate the first bit LLR illustrated in equation (14).

Thus, the first-bit-LLR calculating unit 251 may calculate the first bit LLR without determining the magnitude of the I component input from the demodulating unit 220. The second-bit-LLR calculating unit 252 (see FIG. 4) has the same configuration as that of the first-bit-LLR calculating unit 251, except that the second-bit-LLR calculating unit 252 inputs the Q component instead of the I component.

Figure 8:
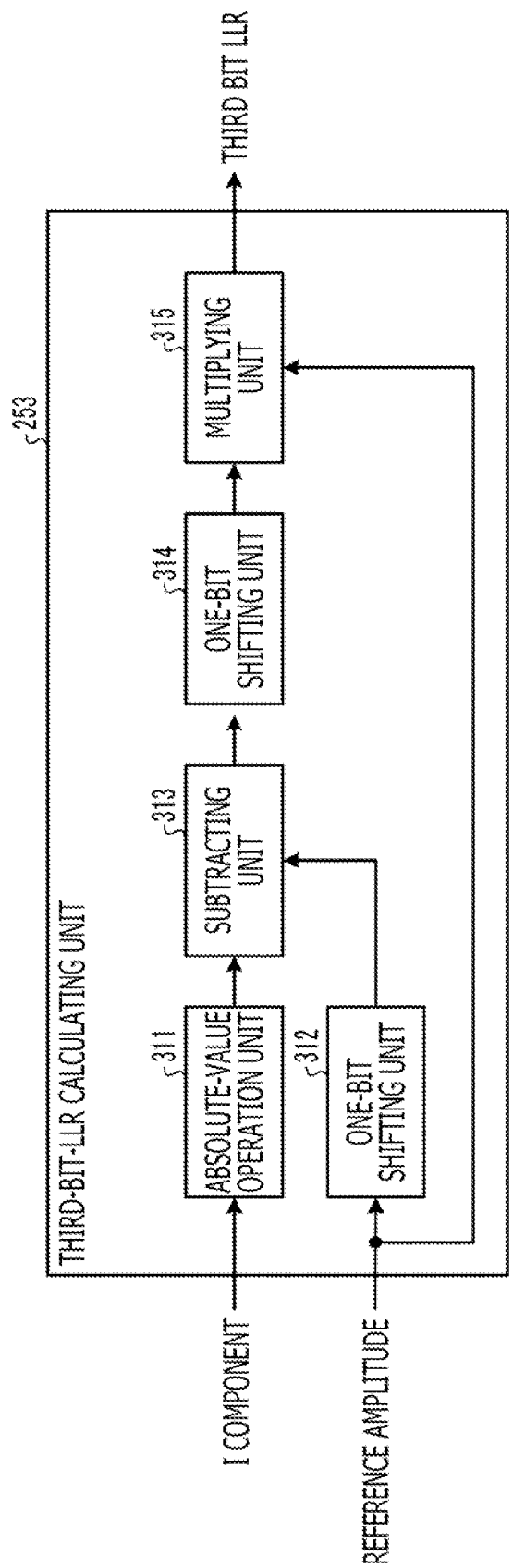
FIG. 8 illustrates a configuration of a third-bit-LLR calculating unit according to the first embodiment.

The third-bit-LLR calculating unit 253 is configured as illustrated in FIG. 8. That is, the third-bit-LLR calculating unit 253 includes an absolute-value operation unit 311, a one-bit shifting unit 312, a subtracting unit 313, a one-bit shifting unit 314, and a multiplying unit 315.

The I component output from the demodulating unit 220 is input to the absolute-value operation unit 311, while the reference amplitude output from the reference-amplitude calculating unit 240 is input to the one-bit shifting unit 312 and the multiplying unit 315. The absolute-value operation unit 311 obtains the absolute value |Re(r)| of the I component. The one-bit shifting unit 312 shifts the input by one bit to double the reference amplitude to 2K.

The subtracting unit 313 performs the operation of 2K−|Re(r)|. The one-bit shifting unit 314 shifts the result of the subtraction performed by the subtracting unit 313 by one bit to double the result to 2(2K−|Re(r)|). The multiplying unit 315 multiplies the output of the one-bit shifting unit 314 by K/σ² to calculate the third bit LLR illustrated in equation (16).

Thus, the third-bit-LLR calculating unit 253 may calculate the third bit LLR without determining the magnitude of the I component input from the demodulating unit 220. The fourth-bit-LLR calculating unit 254 (see FIG. 4) has the same configuration as that of the third-bit-LLR calculating unit 253, except that the fourth-bit-LLR calculating unit 254 inputs the Q component instead of the I component.

FIG. 7 and FIG. 8 illustrate functional blocks for calculating the first bit LLR and the third bit LLR, respectively. Actual devices do not necessarily have to be physically configured as illustrated in FIG. 7 and FIG. 8. For example, only one adder or subtracter may be used to perform the operations performed by the plurality of adding units and subtracting units illustrated in FIG. 7 and FIG. 8.

Figure 9:
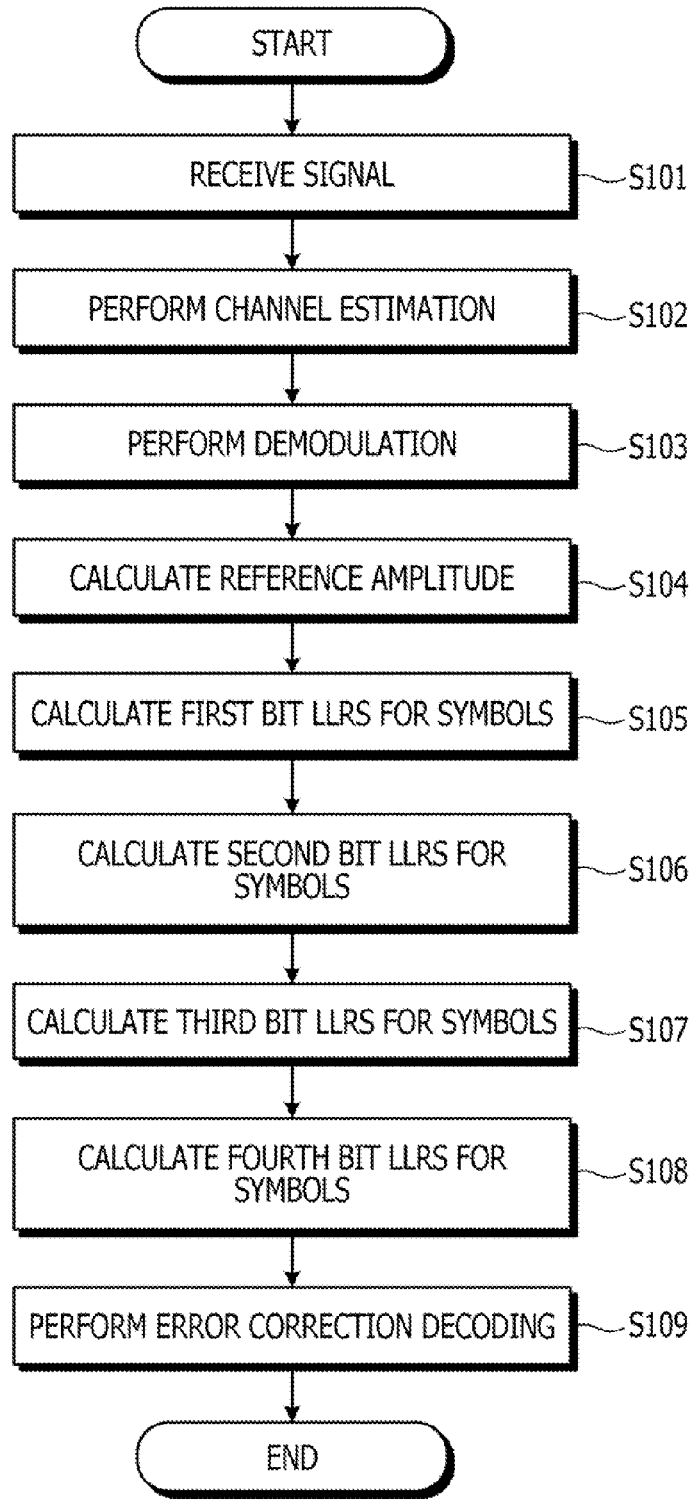
FIG. 9 is a flowchart illustrating an error correction decoding method according to the first embodiment.

Next, an error correction decoding method according to the present embodiment will be described with reference to the flowchart of FIG. 9. The following will describe an operation of the receiving apparatus 200 that receives radio signals transmitted from the transmitting apparatus 100.

A radio signal transmitted from the transmitting apparatus 100 is received through the antenna by the radio receiving unit 210 of the receiving apparatus 200 (step S101). The radio receiving unit 210 performs certain radio receiving processing on the received signal, which is output to the demodulating unit 220 and the channel estimating unit 230. The channel estimating unit 230 performs channel estimation on the received signal (step S102). The resulting channel estimate is output to the demodulating unit 220 and the reference-amplitude calculating unit 240. The demodulating unit 220 uses the channel estimate to demodulate the received signal (step S103). The I and Q components of a plurality of received symbols included in the received signal are output to the soft-decision-information calculating unit 250.

The reference-amplitude calculating unit 240 calculates a reference amplitude from the channel estimate and a coefficient stored by the coefficient storage unit 242 (step S104). The calculated reference amplitude is output to the soft-decision-information calculating unit 250. For convenience of explanation, in FIG. 9, the reference-amplitude calculating unit 240 calculates the reference amplitude (step S104) after the demodulating unit 220 demodulates the received signal (step S103). However, the demodulation and the calculation of the reference amplitude may be executed in reverse order or substantially simultaneous. After the demodulation of the received signal and the calculation of the reference amplitude, the soft-decision-information calculating unit 250 calculates the first to fourth bit LLRs.

Specifically, the first-bit-LLR calculating unit 251 substitutes the reference amplitude and the I components of the plurality of received symbols, the I components being sequentially input, into equation (14) to calculate first bit LLRs (step S105). The second-bit-LLR calculating unit 252 substitutes the reference amplitude and the Q components of the plurality of received symbols, the Q components being sequentially input, into equation (17) to calculate second bit LLRs (step S106). Similarly, the third-bit-LLR calculating unit 253 substitutes the reference amplitude and the I components of the plurality of received symbols into equation (16) to calculate third bit LLRs (step S107). Also, the fourth-bit-LLR calculating unit 254 substitutes the reference amplitude and the Q components of the plurality of received symbols into equation (18) to calculate fourth bit LLRs (step S108). In FIG. 9, for convenience of explanation, LLRs are calculated in order from the first bit LLRs (steps S105 to S108). However, since LLRs for the different bits may be independently calculated, the calculations may be performed in any order or at substantially the same time.

Since calculations of the first to fourth bit LLRs in the first to fourth-bit-LLR calculating units 251 to 254 do not involve determining the magnitudes of the I or Q components, it is possible to input the I or Q components of a plurality of received symbols one after another and determine log likelihood ratios of the plurality of received symbols in parallel. That is, it is possible to quickly and efficiently calculate log likelihood ratios and may reduce or prevent processing delays.

The first to fourth bit LLRs calculated by the first to fourth-bit-LLR calculating units 251 to 254 are output as soft decision information to the error-correction decoding unit 260. Then, the error-correction decoding unit 260 performs error correction decoding, e.g., iterative decoding, using the soft decision information (step S109).

As described above, according to the present embodiment, where 16QAM is used as a modulation scheme, a log likelihood ratio for each bit mapped to a received symbol is calculated uniformly by substituting an I or Q component of the received symbol and a reference amplitude into an operation expression, including an absolute value operation. Therefore, without determining the region to which each received symbol belongs in the IQ plane, it may be possible to calculate log likelihood ratios for a plurality of received symbols in parallel and may reduce or prevent delays in error correction decoding. In other words, it may be possible to quickly and efficiently calculate log likelihood ratios and reduce or prevent processing delays.

Second Embodiment

Figure 10:
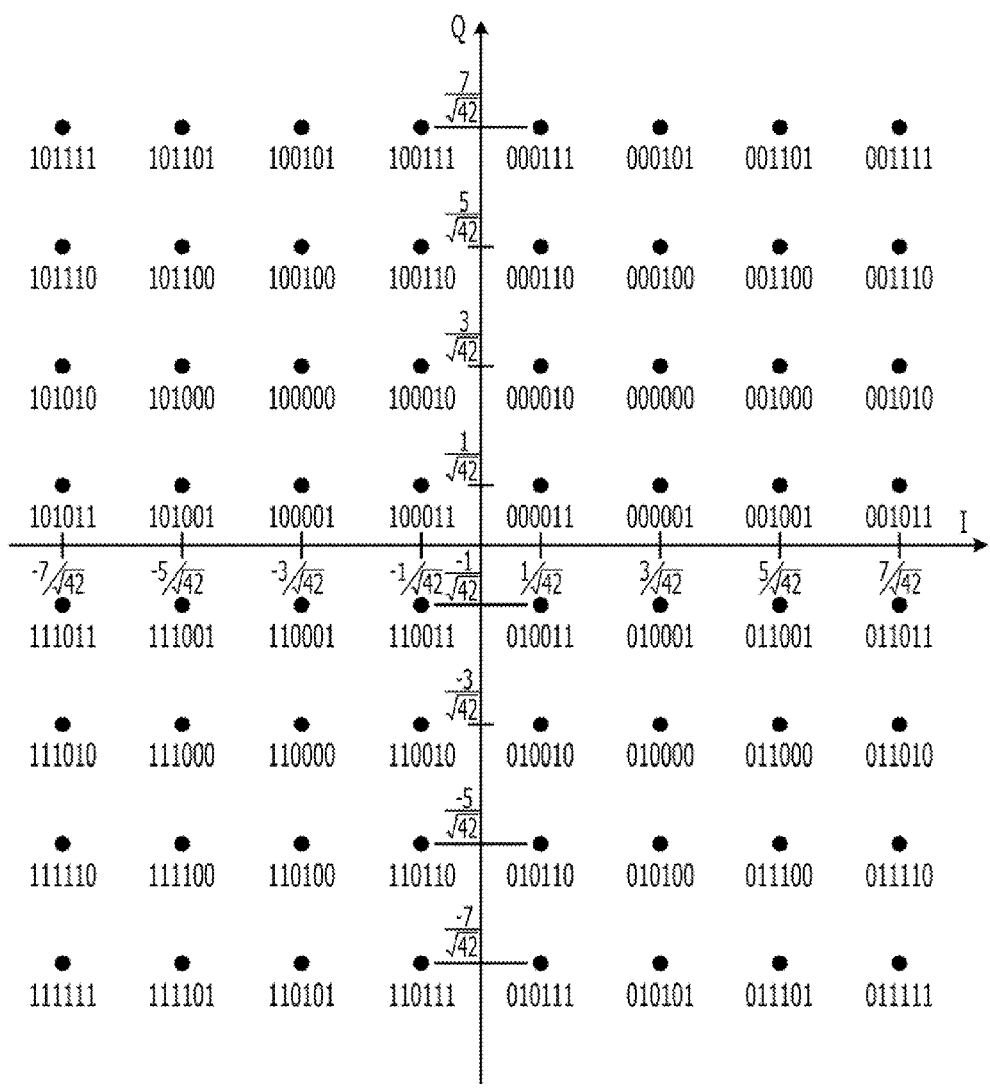
FIG. 10 illustrates a 64QAM constellation.

In a second embodiment, a log likelihood ratio for each bit of a received symbol is calculated in a uniform way when 64QAM is used as a modulation scheme. A configuration of a transmitting apparatus and a receiving apparatus according to the present embodiment is substantially the same as that of the transmitting apparatus 100 and the receiving apparatus 200 according to the first embodiment and thus, the description thereof will be omitted. In the present embodiment, however, the modulating unit 120 of the transmitting apparatus 100 uses 64QAM to modulate encoded data. That is, as illustrated in FIG. 10, the modulating unit 120 maps six bits of encoded data to each constellation point. As illustrated in FIG. 10, the first bits of respective constellation points whose I components are positive have a bit value of "0", and the first bits of respective constellation points whose I components are negative have a bit value of "1". Similarly, the second bits of respective constellation points whose Q components are positive have a bit value of "0", and the second bits of respective constellation points whose Q components are negative have a bit value of "1".

The third bits of respective constellation points in four columns close to the Q axis have a bit value of "0", and the third bits of respective constellation points in four columns far from the Q axis have a bit value of "1". Similarly, the fourth bits of respective constellation points in four rows close to the I axis have a bit value of "0", and the fourth bits of respective constellation points in four rows far from the I axis have a bit value of "1". The fifth bits of respective constellation points in two columns closest to the Q axis and in two columns farthest from the Q axis have a bit value of "1", and the fifth bits of respective constellation points in the other columns have a bit value of "0". Similarly, the sixth bits of respective constellation points in two rows closest to the I axis and in two rows farthest from the I axis have a bit value of "1", and the sixth bits of respective constellation points in the other rows have a bit value of "1". Thus, each bit, which is independently mapped to the I or Q component, may be seen in a one-dimensional coordinate system.

Since the modulation scheme in the modulating unit 120 is different from that in the first embodiment, the reference-amplitude calculating unit 240 and the soft-decision-information calculating unit 250 of the receiving apparatus 200 are also different from those in the first embodiment. Specifically, since 64QAM is used as a modulation scheme, the reference-amplitude calculating unit 240 stores a value expressed by equation (19) below as a coefficient β for use in calculating a reference amplitude:

$$\beta = 1/\sqrt{42} \qquad (19)$$

Figure 11:
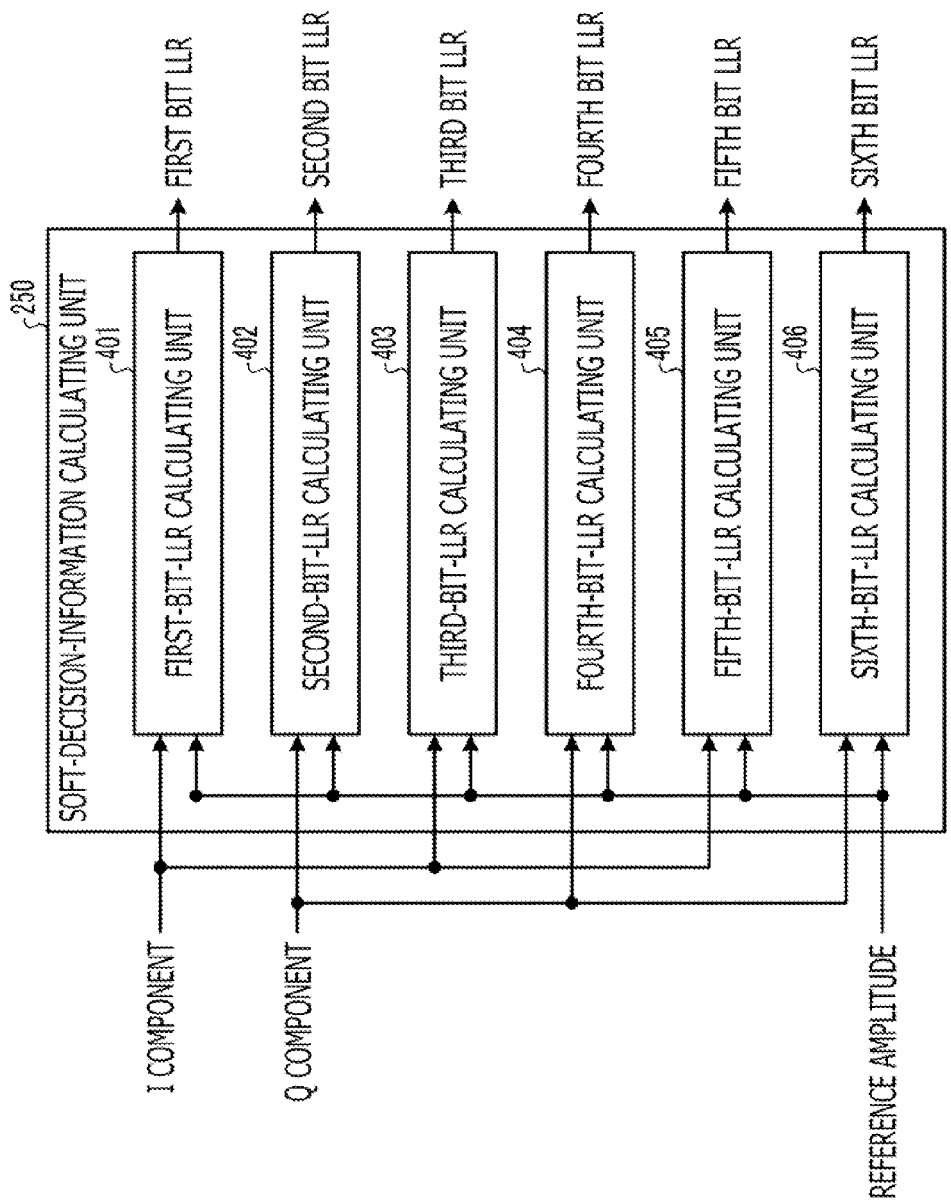
FIG. 11 illustrates a configuration of a soft-decision-information calculating unit according to a second embodiment.

As illustrated in FIG. 11, the soft-decision-information calculating unit 250 includes a first-bit-LLR calculating unit 401, a second-bit-LLR calculating unit 402, a third-bit-LLR calculating unit 403, a fourth-bit-LLR calculating unit 404, a fifth-bit-LLR calculating unit 405, and a sixth-bit-LLR calculating unit 406.

The first-bit-LLR calculating unit 401 performs an operation, including an absolute value operation, on the I component of the received symbol, the I component being output from the demodulating unit 220, and the reference amplitude output from the reference-amplitude calculating unit 240, so as to calculate a first bit LLR.

The second-bit-LLR calculating unit 402 performs an operation, including an absolute value operation, on the Q component of the received symbol, the Q component being output from the demodulating unit 220, and the reference amplitude output from the reference-amplitude calculating unit 240, so as to calculate a second bit LLR.

The third-bit-LLR calculating unit 403 performs an operation, including an absolute value operation, on the I component of the received symbol, the I component being output from the demodulating unit 220, and the reference amplitude output from the reference-amplitude calculating unit 240, so as to calculate a third bit LLR.

The fourth-bit-LLR calculating unit 404 performs an operation, including an absolute value operation, on the Q component of the received symbol, the Q component being output from the demodulating unit 220, and the reference amplitude output from the reference-amplitude calculating unit 240, so as to calculate a fourth bit LLR.

The fifth-bit-LLR calculating unit 405 performs an operation, including an absolute value operation, on the I component of the received symbol, the I component being output from the demodulating unit 220, and the reference amplitude output from the reference-amplitude calculating unit 240, so as to calculate an LLR for the fifth bit of the received symbol (hereinafter referred to as a "fifth bit LLR").

The sixth-bit-LLR calculating unit 406 performs an operation, including an absolute value operation, on the Q component of the received symbol, the Q component being output from the demodulating unit 220, and the reference amplitude output from the reference-amplitude calculating unit 240, so as to calculate an LLR for the sixth bit of the received symbol (hereinafter referred to as a "sixth bit LLR").

The first to sixth-bit-LLR calculating units 401 to 406 each use one operation expression to calculate an LLR. That is, without performing a region determination for the received symbol, each of the first to sixth-bit-LLR calculating units 401 to 406 inputs the I component (i.e., the real part of the received symbol) or the Q component (i.e., the imaginary part of the received symbol) and the reference amplitude into one operation expression to output an LLR. Hereinafter, operation expressions the first to sixth-bit-LLR calculating units 401 to 406 use to calculate respective LLRs will be described. In the present embodiment, operation expressions for each of pairs, the first and second bit LLRs, the third and fourth bit LLRs, and the fifth and sixth bit LLRs, are the same except that the input is the I or Q component. Therefore, the operation expressions for the first, third, and fifth bit LLRs only will be described below.

Figure 12:
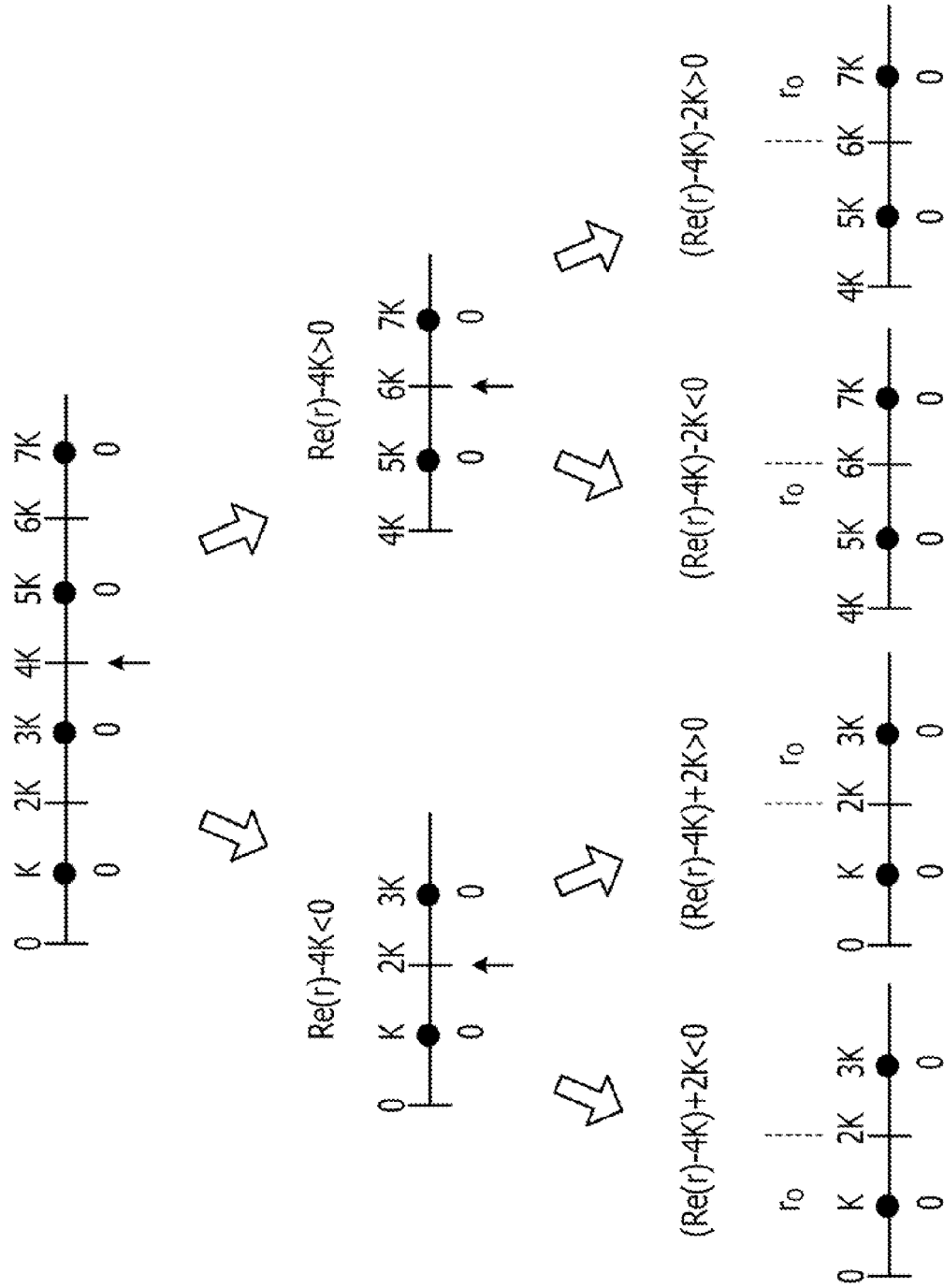
FIG. 12 is a diagram for explaining a first bit LLR according to the second embodiment.

For the first bits, as illustrated in FIG. 10, the bit values of constellation points in a region where I components are positive are "0". Therefore, of the constellation points whose first bits have a bit value of "0", a constellation point closest to the received symbol varies depending on the location of the received symbol. Specifically, as illustrated in FIG. 12, if the I component (i.e., the real part Re(r)) of the received symbol r is smaller than 4K, which is a reference coordinate, a constellation point at a coordinate K or 3K is a closest constellation point having a bit value of "0". If the I component of the received symbol r is greater than 4K, a constellation point at a coordinate 5K or 7K is a closest constellation point having a bit value of "0". In other words, when Re(r)−4K is negative or positive, the number of constellation points having a bit value of "0" and closest to the received symbol r is narrowed down to two.

In the case of Re(r)−4K<0, if the I component of the received symbol r is smaller than 2K, which is a reference coordinate, the constellation point at the coordinate K is a closest constellation point having a bit value of "0". If the I component of the received symbol r is greater than 2K, the constellation point at the coordinate 3K is a closest constellation point having a bit value of "0". That is, depending on whether (Re(r)−4K)+2K is negative or positive, a constellation point having a bit value of "0" and closest to the received symbol r is determined to be a constellation point at the coordinate K or 3K.

Similarly, in the case of Re(r)−4K>0, if the I component of the received symbol r is smaller than 6K, which is a reference coordinate, the constellation point at the coordinate 5K is a closest constellation point having a bit value of "0". If the I component of the received symbol r is greater than 6K, the constellation point at the coordinate 7K is a closest constellation point having a bit value of "0". That is, depending on whether (Re(r)−4K)−2K is negative or positive, a constellation point having a bit value of "0" and closest to the received symbol r is determined to be a constellation point at the coordinate 5K or 7K.

A coordinate of a constellation point having a bit value of "0" and closest to the received symbol r may be expressed as 4K+F2Ksgn(Re(r)−4K)+Ksgn{(Re(r)−4K)−2Ksgn(Re(r)−4K)}, where sgn(x) is a function that returns a positive or negative sign of x.

Similarly, a coordinate of a constellation point having a bit value of "1" and closest to the received symbol r may be expressed as −4K+2Ksgn(Re(r)−4K)+Ksgn{(Re(r)+4K)−2Ksgn(Re(r)+4K)}. Thus, a squared minimum distance between the received symbol r and its closest constellation point having a bit value of "0", and a squared minimum distance between the received symbol r and its closest constellation point having a bit value of "1" may be expressed by equations (20) below:

$$\begin{cases} d_{0,min}^2 = [\{(Re(r) - 4K) - 2K \cdot sgn(Re(r) - 4K)\} - \\ \quad K \cdot sgn\{(Re(r) - 4K) - 2K \cdot sgn(Re(r) - 4K)\}]^2 \\ d_{1,min}^2 = [\{(Re(r) + 4K) - 2K \cdot sgn(Re(r) + 4K)\} - \\ \quad K \cdot sgn\{(Re(r) + 4K) - 2K \cdot sgn(Re(r) + 4K)\}]^2 \end{cases} \quad (20)$$

By substituting a difference between these squared minimum distances into equation (1), the first bit LLR may be calculated by equation (21) below:

$$LLR_1 = \frac{K}{\sigma^2}[8Re(r) + 2(|Re(r) - 4K| - |Re(r) + 4K|) + \\ (|Re(r) - 4K - 2K \cdot sgn(Re(r) - 4K)| - \\ |Re(r) + 4K - 2K \cdot sgn(Re(r) + 4K)|)] \quad (21)$$

Although equation (21) includes absolute value operations and functions for obtaining a positive or negative sign, the first bit LLR may be calculated uniformly by equation (21), regardless of the region to which the received symbol r belongs. That is, when equation (21) is used to calculate the first bit LLR, there is no need to make a region determination for the received symbol r.

Figure 13:
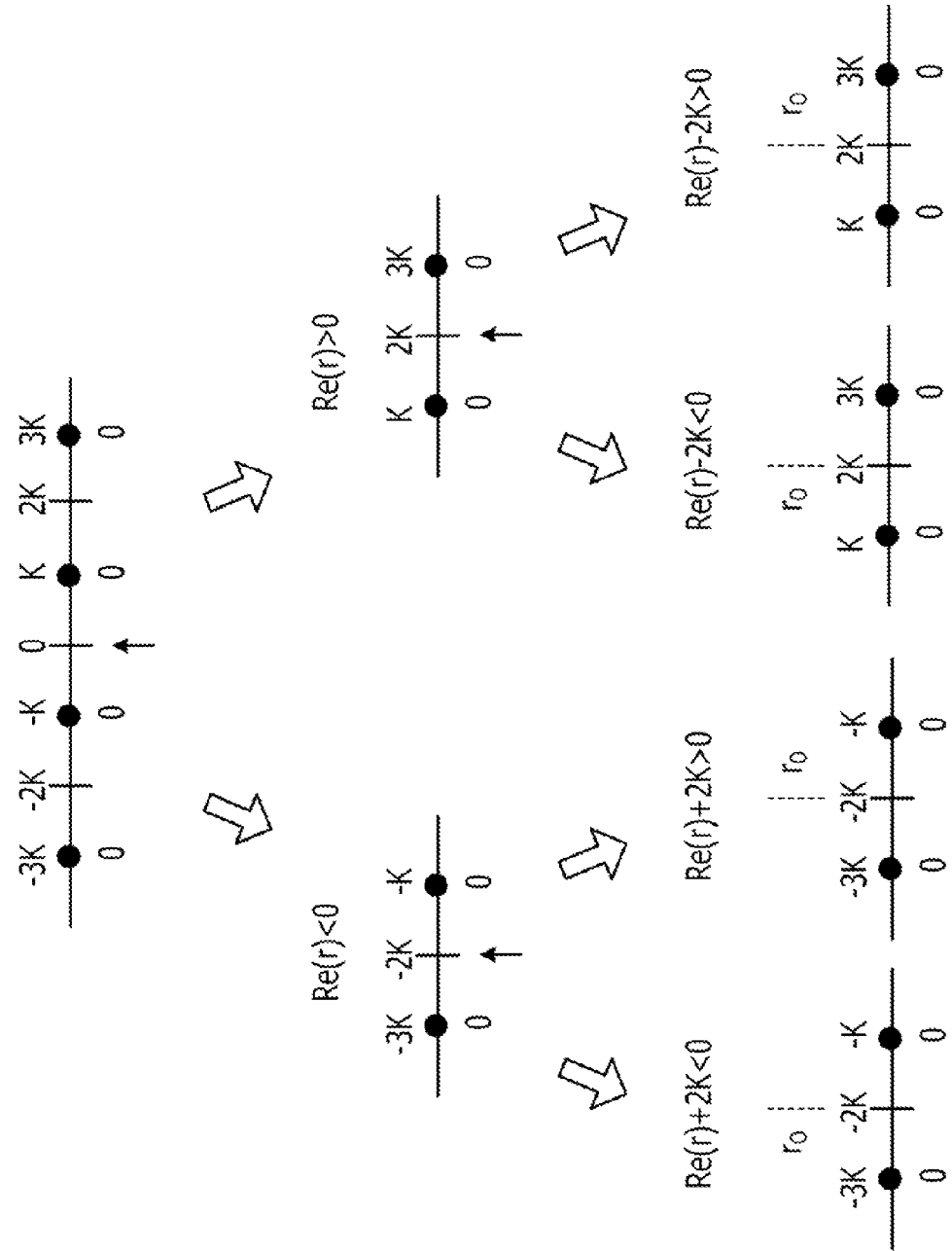
FIG. 13 is a diagram for explaining a third bit LLR according to the second embodiment.

For the third bits, as illustrated in FIG. 10, the bit values of constellation points in four columns close to the Q axis have a bit value of "0". Therefore, of the constellation points whose third bits have a bit value of "0", a constellation point closest to the received symbol varies depending on the location of the received symbol. Specifically, as illustrated in FIG. 13, if the I component (i.e., the real part Re(r)) of the received symbol r is smaller than 0, which is a reference coordinate, a constellation point at a coordinate −3K or −K is a closest constellation point having a bit value of "0". If the I component of the received symbol r is greater than 0, a constellation point at a coordinate K or 3K is a closest constellation point having a bit value of "0". In other words, when Re(r) is negative or positive, the number of constellation points having a bit value of "0" and closest to the received symbol r is narrowed down to two.

In the case of Re(r)<0, if the I component of the received symbol r is smaller than −2K, which is a reference coordinate, the constellation point at the coordinate −3K is a closest constellation point having a bit value of "0". If the I component of the received symbol r is greater than −2K, the constellation point at the coordinate −K is a closest constellation point having a bit value of "0". That is, depending on whether Re(r)+2K is negative or positive, a constellation point having a bit value of "0" and closest to the received symbol r is determined to be a constellation point at the coordinate −3K or −K.

Similarly, in the case of Re(r)>0, if the I component of the received symbol r is smaller than 2K, which is a reference coordinate, the constellation point at the coordinate K is a closest constellation point having a bit value of "0". If the I component of the received symbol r is greater than 2K, the constellation point at the coordinate 3K is a closest constellation point having a bit value of "0". That is, depending on whether Re(r)−2K is negative or positive, a constellation point having a bit value of "0" and closest to the received symbol r is determined to be a constellation point at the coordinate K or 3K. Therefore, a coordinate of a constellation point having a bit value of "0" and closest to the received symbol r may be expressed as 2Ksgn(Re(r))+Ksgn{Re(r)−2Ksgn(Re(r))}.

Similarly, a coordinate of a constellation point having a bit value of "1" and closest to the received symbol r may be expressed as 6Ksgn(Re(r))+Ksgn{Re(r)−6Ksgn(Re(r))}. Thus, a squared minimum distance between the received symbol r and its closest constellation point having a bit value of "0" and a squared minimum distance between the received symbol r and its closest constellation point having a bit value of "1" may be expressed by equations (22) below:

$$\begin{cases} d_{0,min}^2 = [\{Re(r) - 2K \cdot sgn(Re(r))\} - K \cdot sgn\{Re(r) - 2K \cdot sgn(Re(r))\}]^2 \\ d_{1,min}^2 = [\{Re(r) - 6K \cdot sgn(Re(r))\} - K \cdot sgn\{Re(r) - 6K \cdot (Re(r))\}]^2 \end{cases} \quad (22)$$

By substituting a difference between these squared minimum distances into equation (1), the third bit LLR may be calculated by equation (23) below:

$$LLR_3 = \frac{K[-4|Re(r)| + 16K + |Re(r) - 2K \cdot sgn(Re(r))| - |Re(r) - 6K \cdot sgn(Re(r))|]}{\sigma^2} \quad (23)$$

Although equation (23) includes absolute value operations and functions for obtaining a positive or negative sign, the third bit LLR may be calculated uniformly by equation (23), regardless of the region to which the received symbol r belongs. That is, when equation (23) is used to calculate the third bit LLR, there is no need to make a region determination for the received symbol r.

Figure 14:
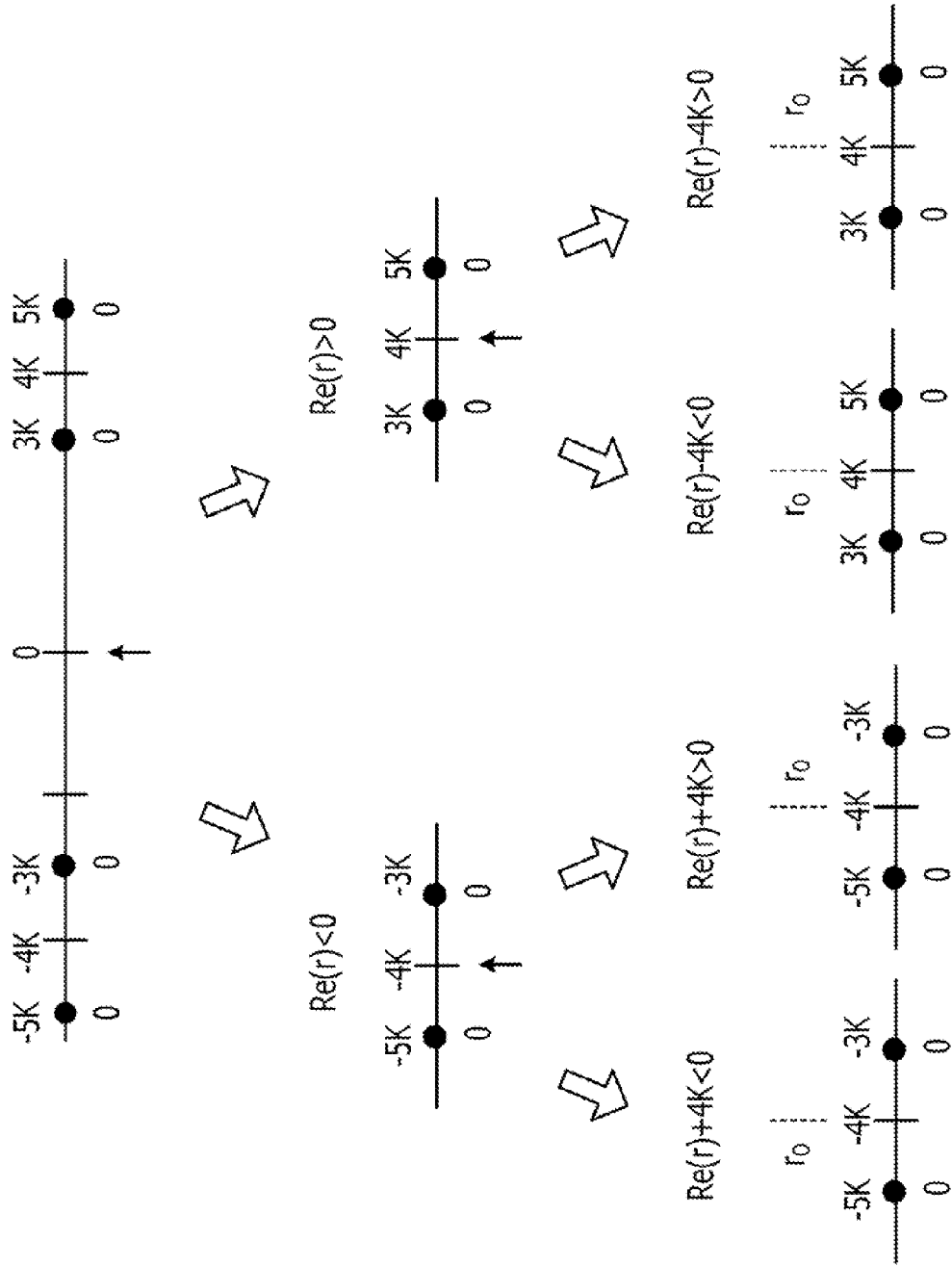
FIG. 14 is a diagram for explaining a fifth bit LLR according to the second embodiment.

For the fifth bits, as illustrated in FIG. 10, the bit values of constellation points in four columns second and third closest to the Q axis have a bit value of "0". Therefore, of the constellation points whose fifth bits have a bit value of "0", a constellation point closest to the received symbol varies depending on the location of the received symbol. Specifically, as illustrated in FIG. 14, if the I component (i.e., the real part Re(r)) of the received symbol r is smaller than 0, which is a reference coordinate, a constellation point at a coordinate −5K or −3K is a closest constellation point having a bit value of "0". If the I component of the received symbol r is greater than 0, a constellation point at a coordinate 3K or 5K is a closest constellation point having a bit value of "0". In other words, when Re(r) is negative or positive, the number of constellation points having a bit value of "0" and closest to the received symbol r is narrowed down to two.

In the case of Re(r)<0, if the I component of the received symbol r is smaller than −4K, which is a reference coordinate, the constellation point at the coordinate −5K is a closest constellation point having a bit value of "0". If the I component of the received symbol r is greater than −4K, the constellation point at the coordinate −3K is a closest constellation point having a bit value of "0". That is, depending on whether Re(r)+4K is negative or positive, a constellation point having a bit value of "0" and closest to the received symbol r is determined to be a constellation point at the coordinate −5K or −3K.

Similarly, in the case of Re(r)>0, if the I component of the received symbol r is smaller than 4K, which is a reference coordinate, the constellation point at the coordinate 3K is a closest constellation point having a bit value of "0". If the I component of the received symbol r is greater than 4K, the constellation point at the coordinate 5K is a closest constellation point having a bit value of "0". That is, depending on whether Re(r)−4K is negative or positive, a constellation point having a bit value of "0" and closest to the received symbol r is determined to be a constellation point at the coordinate 3K or 5K. Therefore, a coordinate of a constellation point having a bit value of "0" and closest to the received symbol r may be expressed as 4Ksgn(Re(r))+Ksgn{Re(r)−4Ksgn(Re(r))}.

Similarly, a coordinate of a constellation point having a bit value of "1" and closest to the received symbol r may be expressed as 4Ksgn(Re(r))+3Ksgn{Re(r)−4Ksgn(Re(r))}. Thus, a squared minimum distance between the received symbol r and its closest constellation point having a bit value of "0" and a squared minimum distance between the received symbol r and its closest constellation point having a bit value of "1" may be expressed by equations (24) below:

$$\begin{cases} d_{0,min}^2 = [\{Re(r) - 4K \cdot sgn(Re(r))\} - K \cdot sgn\{Re(r) - 4K \cdot sgn(Re(r))\}]^2 \\ d_{1,min}^2 = [\{Re(r) - 4K \cdot sgn(Re(r))\} - 3K \cdot sgn\{Re(r) - 4K \cdot sgn(Re(r))\}]^2 \end{cases} \quad (24)$$

By substituting a difference between these squared minimum distances into equation (1), the fifth bit LLR may be calculated by equation (25) below:

$$LLR_5 = \frac{2K[2K - |Re(r) - 4K \cdot sgn(Re(r))|]}{\sigma^2} \quad (25)$$

Although equation (25) includes an absolute value operation and a function for obtaining a positive or negative sign, the fifth bit LLR may be calculated uniformly by equation (25), regardless of the region to which the received symbol r belongs. That is, when equation (25) is used to calculate the fifth bit LLR, there is no need to make a region determination for the received symbol r. As described above, since the second, fourth, and sixth bits are mapped to the Q component (i.e., imaginary part Im(r)), the second, fourth, and sixth bit LLRs may be calculated by equations (26), (27), and (28), respectively, obtained by replacing Re(r) in equations (21), (23), and (25) with Im(r):

$$LLR_2 = \frac{K}{\sigma^2}[8\text{Im}(r) + 2(|\text{Im}(r) - 4K| - |\text{Im}(r) + 4K|) + \quad (26)$$
$$(|\text{Im}(r) - 4K - 2K \cdot \text{sgn}(\text{Im}(r) - 4K)| -$$
$$|\text{Im}(r) + 4K - 2K \cdot \text{sgn}(\text{Im}(r) + 4K)|)]$$

$$LLR_4 = \frac{K[-4|\text{Im}(r)| + 16K + |\text{Im}(r) - 2K \cdot \text{sgn}(\text{Im}(r))| - |\text{Im}(r) - 6K \cdot \text{sgn}(\text{Im}(r))|]}{\sigma^2} \quad (27)$$

$$LLR_6 = \frac{2K[2K - |\text{Im}(r) - 4K \cdot \text{sgn}(\text{Im}(r))|]}{\sigma^2} \quad (28)$$

Again, although these equations include absolute value operations and sgn functions for obtaining a positive or negative sign, there is no need to make a region determination for the received symbol r. Thus, each of the second, fourth, and sixth bit LLRs may be calculated in a uniform way.

As described above, each of the first to sixth bit LLRs is calculated uniformly by an operation expression including one or more absolute value operations. Thus, the first to sixth-bit-LLR calculating units 401 to 406 each input the I or Q component and the reference amplitude and calculate the first to sixth bit LLRs using equation (21), (23), (25), and (26) to (28), respectively.

Figure 15:
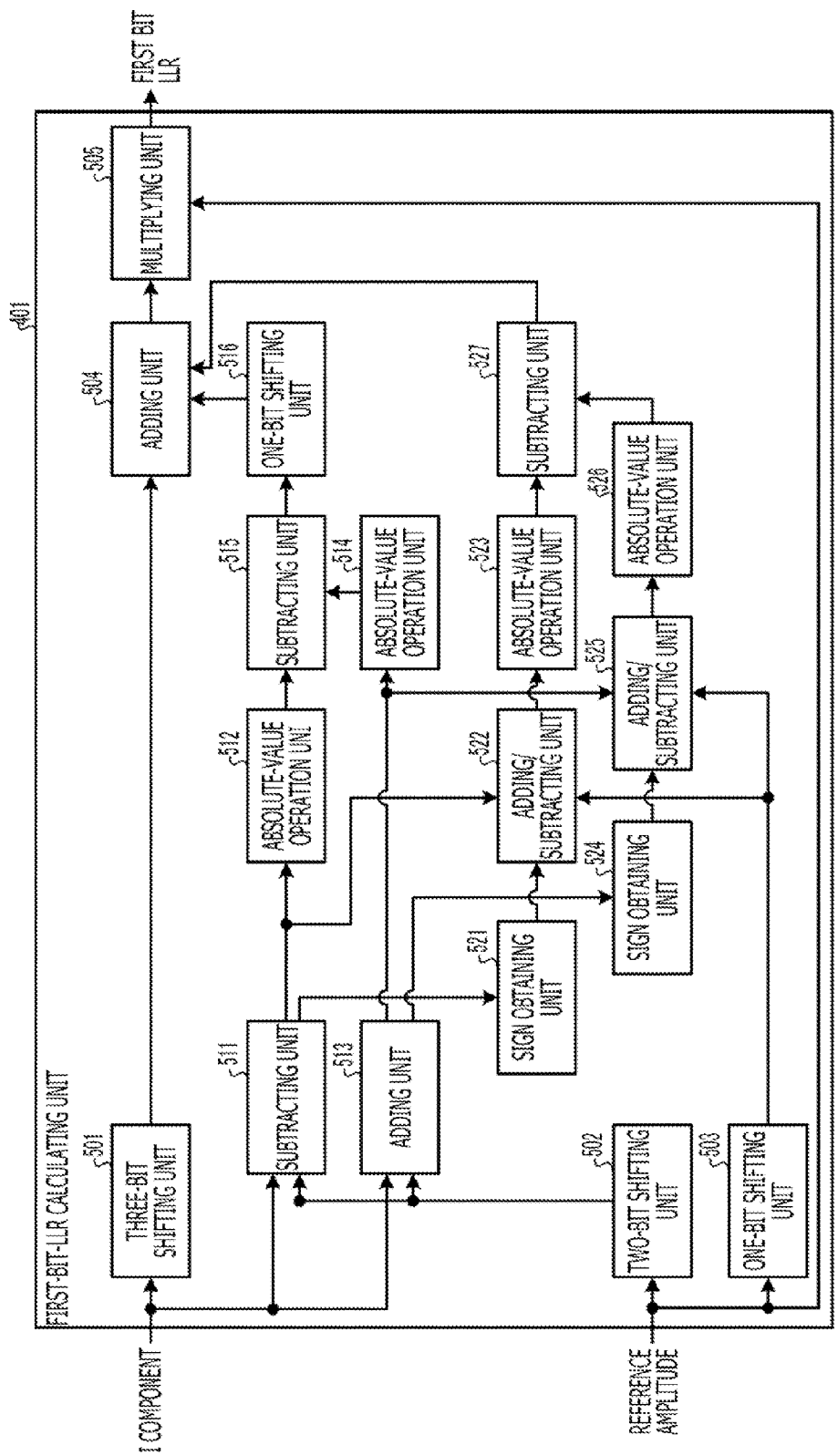
FIG. 15 illustrates a configuration of a first-bit-LLR calculating unit according to the second embodiment.

Specifically, for example, the first-bit-LLR calculating unit 401 is configured as illustrated in FIG. 15. That is, the first-bit-LLR calculating unit 401 includes a three-bit shifting unit 501, a two-bit shifting unit 502, a one-bit shifting unit 503, an adding unit 504, a multiplying unit 505, a subtracting unit 511, an absolute-value operation unit 512, an adding unit 513, an absolute-value operation unit 514, a subtracting unit 515, a one-bit shifting unit 516, a sign obtaining unit 521, an adding/subtracting unit 522, an absolute-value operation unit 523, a sign obtaining unit 524, an adding/subtracting unit 525, an absolute-value operation unit 526, and a subtracting unit 527.

The I component output from the demodulating unit 220 is input to the three-bit shifting unit 501, the subtracting unit 511, and the adding unit 513. The reference amplitude output from the reference-amplitude calculating unit 240 is input to the two-bit shifting unit 502, the one-bit shifting unit 503, and the multiplying unit 505. The three-bit shifting unit 501 shifts the input by three bits. This multiplies the I component by eight to yield 8Re(r). The two-bit shifting unit 502 and the one-bit shifting unit 503 obtain 4K and 2K, respectively.

The subtracting unit 511 and the adding unit 513 perform the operations of Re(r)−4K and Re(r)+4K, respectively. The absolute-value operation units 512 and 514 calculate the absolute values of Re(r)−4K and Re(r)+4K, respectively. A difference between the calculated absolute values is calculated by the subtracting unit 515, and the resulting |Re(r)−4K|−|Re(r)+4K| is doubled by the one-bit shifting unit 516. Thus, 2(|Re(r)−4K|−|Re(r)+4K|) is output from the one-bit shifting unit 516.

The sign obtaining units 521 and 524 obtain the positive/negative signs of the results of the operations performed by the subtracting unit 511 and the adding unit 513, respectively. Depending on the signs obtained, the sign obtaining units 521 and 524 switch the operations to be performed by the adding/subtracting units 522 and 525, respectively, to addition or subtraction. Specifically, if the sign of the result of subtraction performed by the subtracting unit 511 is positive, the sign obtaining unit 521 causes the adding/subtracting unit 522 to perform a subtraction. On the other hand, if the sign of the result of subtraction performed by the subtracting unit 511 is negative, the sign obtaining unit 521 causes the adding/subtracting unit 522 to perform an addition. Thus, if the result of the subtraction performed by the subtracting unit 511 is positive, the adding/subtracting unit 522 subtracts 2K output by the one-bit shifting unit 503 from the result of the subtraction Re(r)−4K performed by the subtracting unit 511. If the result of the subtraction performed by the subtracting unit 511 is negative, the adding/subtracting unit 522 adds 2K output by the one-bit shifting unit 503 to the result of the subtraction Re(r)−4K performed by the subtracting unit 511.

Similarly, if the sign of the result of addition performed by the adding unit 513 is positive, the sign obtaining unit 524 causes the adding/subtracting unit 525 to perform a subtraction. If the sign of the result of addition performed by the adding unit 513 is negative, the sign obtaining unit 524 causes the adding/subtracting unit 525 to perform an addition. Thus, if the result of the addition performed by the adding unit 513 is positive, the adding/subtracting unit 525 subtracts 2K output by the one-bit shifting unit 503 from the result of the addition Re(r)+4K performed by the adding unit 513. Also, if the result of the addition performed by the adding unit 513 is negative, the adding/subtracting unit 525 adds 2K output by the one-bit shifting unit 503 to the result of the addition Re(r)+4K performed by the adding unit 513.

The absolute-value operation units 523 and 526 calculate the absolute values of the results of the operations performed by the adding/subtracting units 522 and 525, respectively. The subtracting unit 527 subtracts the result of the operation performed by the absolute-value operation unit 526 from the result of the operation performed by the absolute-value operation unit 523. Thus, |Re(r)−4K−2Ksgn(Re(r)−4K)|−|Re(r)+4K−2Ksgn(Re(r)+4K)| is output from the subtracting unit 527.

The adding unit 504 adds up the outputs of the three-bit shifting unit 501, one-bit shifting unit 516, and subtracting unit 527. The multiplying unit 505 multiplies the result of addition of the adding unit 504 by $K/\sigma^2$ to calculate the first bit LLR illustrated in equation (21).

Thus, the first-bit-LLR calculating unit 401 may calculate the first bit LLR without determining the magnitude of the I component input from the demodulating unit 220. The second-bit-LLR calculating unit 402 (see FIG. 11) has the same configuration as that of the first-bit-LLR calculating unit 401, except that the second-bit-LLR calculating unit 402 inputs the Q component instead of the I component.

Figure 16:
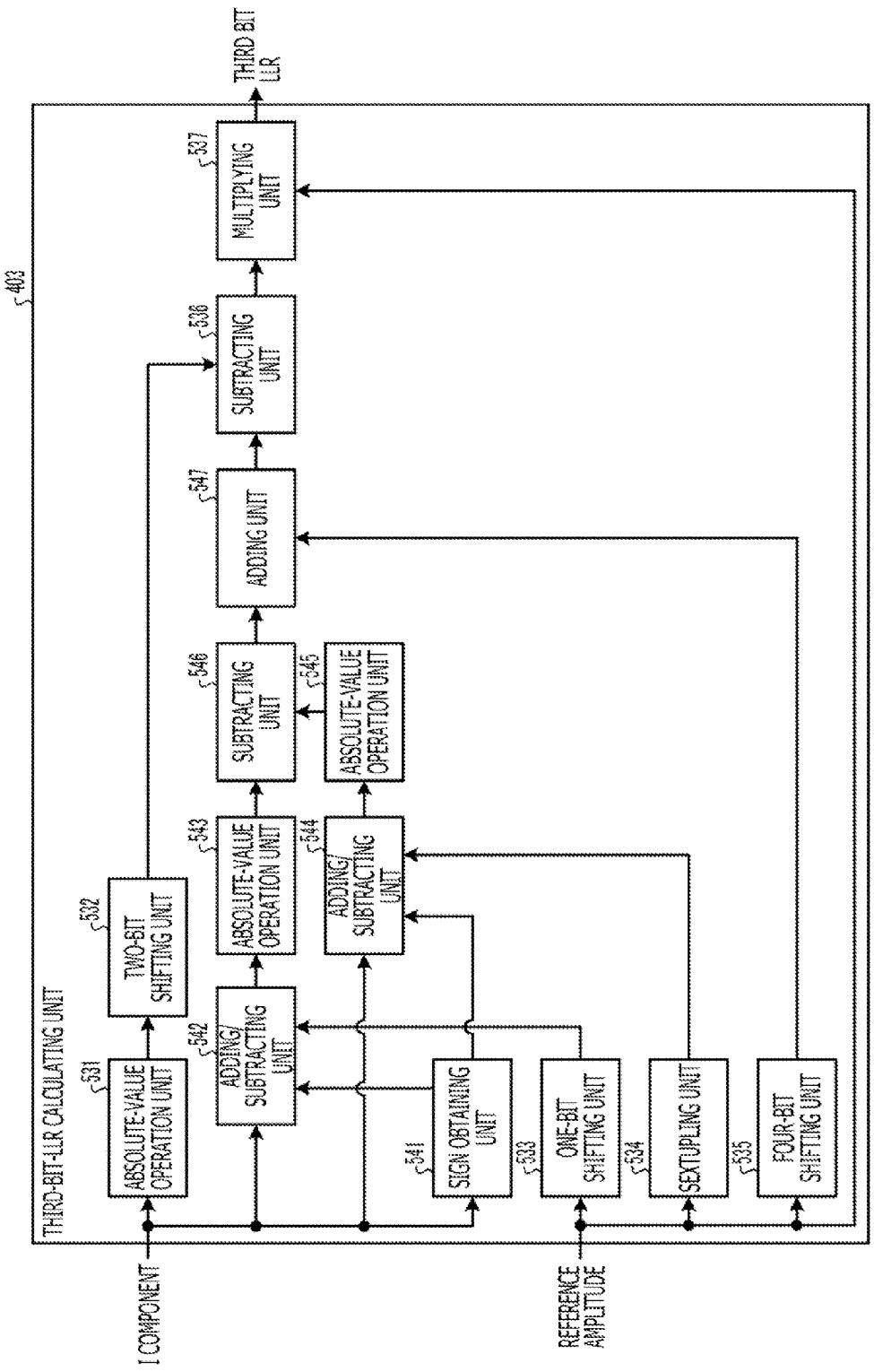
FIG. 16 illustrates a configuration of a third-bit-LLR calculating unit according to the second embodiment.

The third-bit-LLR calculating unit 403 is configured as illustrated in FIG. 16. That is, the third-bit-LLR calculating unit 403 includes an absolute-value operation unit 531, a two-bit shifting unit 532, a one-bit shifting unit 533, a sextupling unit 534, a four-bit shifting unit 535, a subtracting unit 536, a multiplying unit 537, a sign obtaining unit 541, an adding/subtracting unit 542, an absolute-value operation unit 543, an adding/subtracting unit 544, an absolute-value operation unit 545, a subtracting unit 546, and an adding unit 547.

The I component output from the demodulating unit 220 is input to the absolute-value operation unit 531, the sign obtaining unit 541, and the adding/subtracting units 542 and 544. The reference amplitude output from the reference-amplitude calculating unit 240 is input to the one-bit shifting unit 533, the sextupling unit 534, the four-bit shifting unit 535, and the multiplying unit 537. The absolute-value operation unit 531 obtains the absolute value |Re(r)| of the I component. The two-bit shifting unit 532 multiplies the absolute value of the I component by four to output 4|Re(r)|. The one-bit shifting unit 533 doubles the reference amplitude to 2K. The sextupling unit 534 multiplies the reference amplitude by six to obtain 6K. The four-bit shifting unit 535 multiplies the reference amplitude by 16 to obtain 16K.

The sign obtaining unit 541 obtains the positive or negative sign of the I component. Depending on the sign obtained, the sign obtaining unit 541 switches the operations to be performed by the adding/subtracting units 542 and 544 to addition or subtraction. Specifically, if the sign of the I component is positive, the sign obtaining unit 541 causes the adding/subtracting units 542 and 544 to perform a subtraction. On the other hand, if the sign of the I component is negative, the sign obtaining unit 541 causes the adding/subtracting units 542 and 544 to perform an addition. Thus, if the I component is positive, the adding/subtracting unit 542 subtracts 2K output by the one-bit shifting unit 533 from the I component Re(r). If the I component is negative, the adding/subtracting unit 542 adds 2K output by the one-bit shifting unit 533 to the I component Re(r). Similarly, if the I component is positive, the adding/subtracting unit 544 subtracts 6K output by the sextupling unit 534 from the I component Re(r). If the I component is negative, the adding/subtracting unit 544 adds 6K output by the sextupling unit 534 to the I component Re(r).

The absolute-value operation units 543 and 545 calculate the absolute values of the results of the operations performed by the adding/subtracting units 542 and 544, respectively. The subtracting unit 546 subtracts the result of the operation performed by the absolute-value operation unit 545 from the result of the operation performed by the absolute-value operation unit 543. The adding unit 547 adds 16K output from the four-bit shifting unit 535 to the output of the subtracting unit 546. Thus, 16K+|Re(r)−2Ksgn(Re(r))|−|Re(r)−6Ksgn(Re(r))| is output from the adding unit 547.

The subtracting unit 536 subtracts the output of the two-bit shifting unit 532 from the output of the adding unit 547. The multiplying unit 537 multiplies the result of the subtraction performed by the subtracting unit 536 by $K/\sigma^2$ to calculate the third bit LLR illustrated in equation (23).

Thus, the third-bit-LLR calculating unit 403 may calculate the third bit LLR without determining the magnitude of the I component input from the demodulating unit 220. The fourth-bit-LLR calculating unit 404 (see FIG. 11) has the same configuration as that of the third-bit-LLR calculating unit 403, except that the fourth-bit-LLR calculating unit 404 inputs the Q component instead of the I component.

Figure 17:
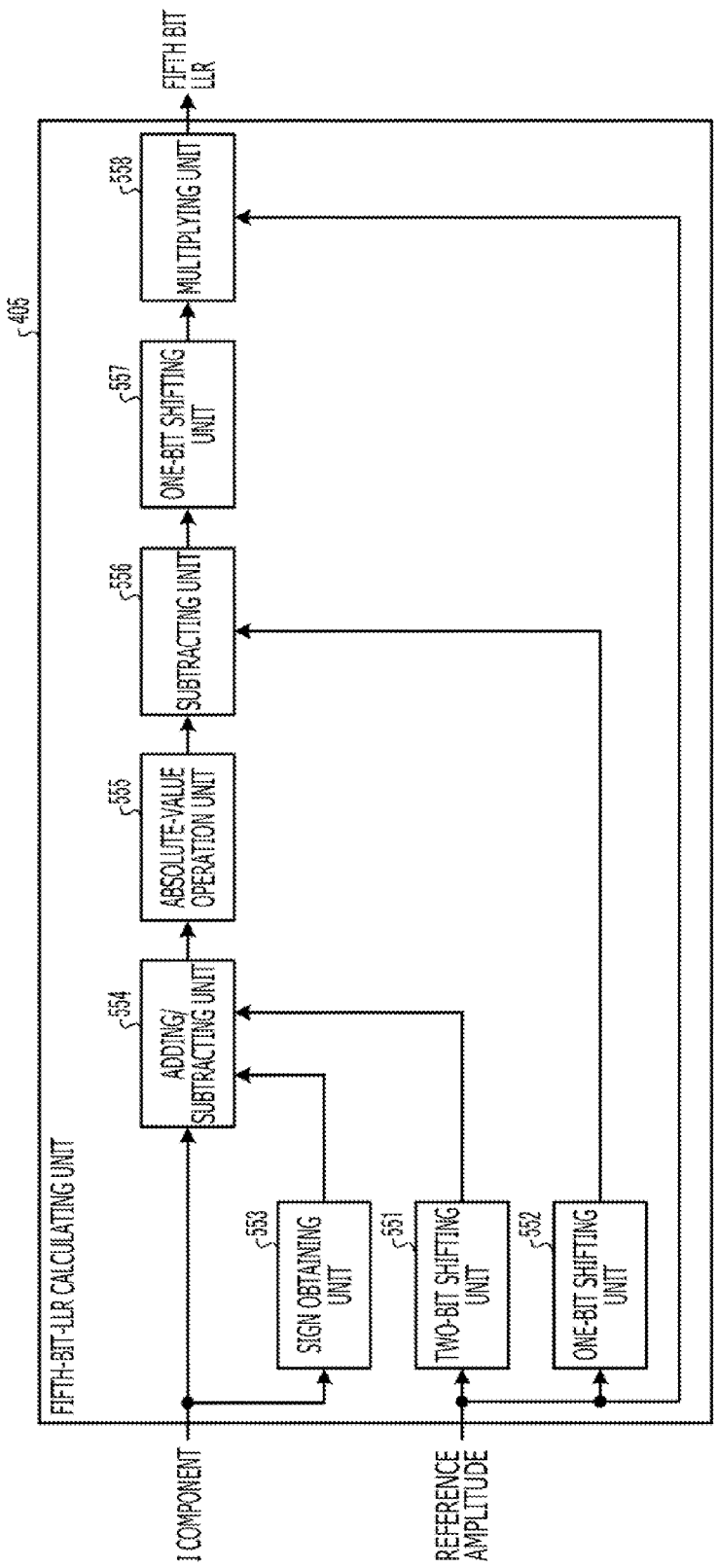
FIG. 17 illustrates a configuration of a fifth-bit-LLR calculating unit according to the second embodiment.

The fifth-bit-LLR calculating unit 405 is configured as illustrated in FIG. 17. That is, the fifth-bit-LLR calculating unit 405 includes a two-bit shifting unit 551, a one-bit shifting unit 552, a sign obtaining unit 553, an adding/subtracting unit 554, an absolute-value operation unit 555, a subtracting unit 556, a one-bit shifting unit 557, and a multiplying unit 558.

The I component output from the demodulating unit 220 is input to the sign obtaining unit 553 and the adding/subtracting unit 554. The reference amplitude output from the reference-amplitude calculating unit 240 is input to the two-bit shifting unit 551, the one-bit shifting unit 552, and the multiplying unit 558. The two-bit shifting unit 551 multiplies the reference amplitude by four to obtain 4K. The one-bit shifting unit 552 doubles the reference amplitude to obtain 2K.

The sign obtaining unit 553 obtains the positive or negative sign of the I component. Depending on the sign obtained, the sign obtaining unit 553 switches the operation to be performed by the adding/subtracting unit 554 to addition or subtraction. Specifically, if the sign of the I component is positive, the sign obtaining unit 553 causes the adding/subtracting unit 554 to perform a subtraction. On the other hand, if the sign of the I component is negative, the sign obtaining unit 553 causes the adding/subtracting unit 554 to perform an addition. Thus, if the I component is positive, the adding/subtracting unit 554 subtracts 4K output by the two-bit shifting unit 551 from the I component Re(r). If the I component is negative, the adding/subtracting unit 554 adds 4K output by the two-bit shifting unit 551 to the I component Re(r).

The absolute-value operation unit 555 calculates the absolute value of the result of the operation performed by the adding/subtracting unit 554. The subtracting unit 556 subtracts the result of the operation performed by the absolute-value operation unit 555 from 2K output from the adding/subtracting unit 522. The one-bit shifting unit 557 doubles the result of the subtraction performed by the subtracting unit 556. Thus, 2[2K−|Re(r)−4Ksgn(Re(r))|] is output from the one-bit shifting unit 557. The multiplying unit 558 multiplies the output of the one-bit shifting unit 557 by $K/\sigma^2$ to calculate the fifth bit LLR illustrated in equation (25).

Thus, the fifth-bit-LLR calculating unit 405 may calculate the fifth bit LLR without determining the magnitude of the I component input from the demodulating unit 220. The sixth-bit-LLR calculating unit 406 (see FIG. 11) has the same configuration as that of the fifth-bit-LLR calculating unit 405, except that the sixth-bit-LLR calculating unit 406 inputs the Q component instead of the I component.

FIGS. 15, 16, and 17 illustrate functional blocks for calculating the first, third, and fifth bit LLRs, respectively. Actual devices do not necessarily have to be physically configured as illustrated in FIGS. 15, 16, and 17. For example, one adder or subtracter may be used to perform the operations performed by the plurality of adding units and subtracting units illustrated in FIGS. 15, 16, and 17.

As described above, according to the present embodiment, where 64QAM is used as a modulation scheme, a log likelihood ratio for each bit mapped to a received symbol is calculated uniformly by substituting an I or Q component of the received symbol and a reference amplitude into an operation expression, including an absolute value operation and a sign obtaining function. Therefore, without determining the region to which each received symbol belongs in the IQ plane, it is possible to calculate log likelihood ratios for a plurality of received symbols in parallel and reduce or prevent delays in error correction decoding. In other words, it is possible to quickly and efficiently calculate log likelihood ratios and reduce or prevent processing delays.

The modulation schemes used in the above-described embodiments are 16QAM and 64QAM. However, even in the cases of modulation schemes where the number of modulation levels is larger, it is possible to reduce or prevent processing delays by using an operation expression for uniformly calculating a log likelihood ratio for each bit.

The above-described embodiments describe a single-input single-output (siso) communication system in which the transmitting apparatus 100 and the receiving apparatus 200 each have a single antenna. However, the present invention is not limited to this. That is, the present invention is also applicable to Multi-Input Multi-Output (MIMO) communication systems in which a transmitting apparatus and a receiving apparatus each have a plurality of antennas, and to communication systems using transmission or reception diversity. The present invention is also applicable to multicarrier communication systems, e.g., Orthogonal Frequency Division Multiplexing (OFDM) communication systems.

It is also possible to create a program written in a computer-executable language for performing the error correction processing of the embodiments described above. In this case, by having a computer included in a radio communication apparatus execute the program, substantially the same effects as those of the above-described embodiments may be achieved. The same error correction processing as that of the above-described embodiments may be realized by recording the program in a computer-readable recording medium, and having a computer read and execute the program recorded in the recording medium.

Figure 18:
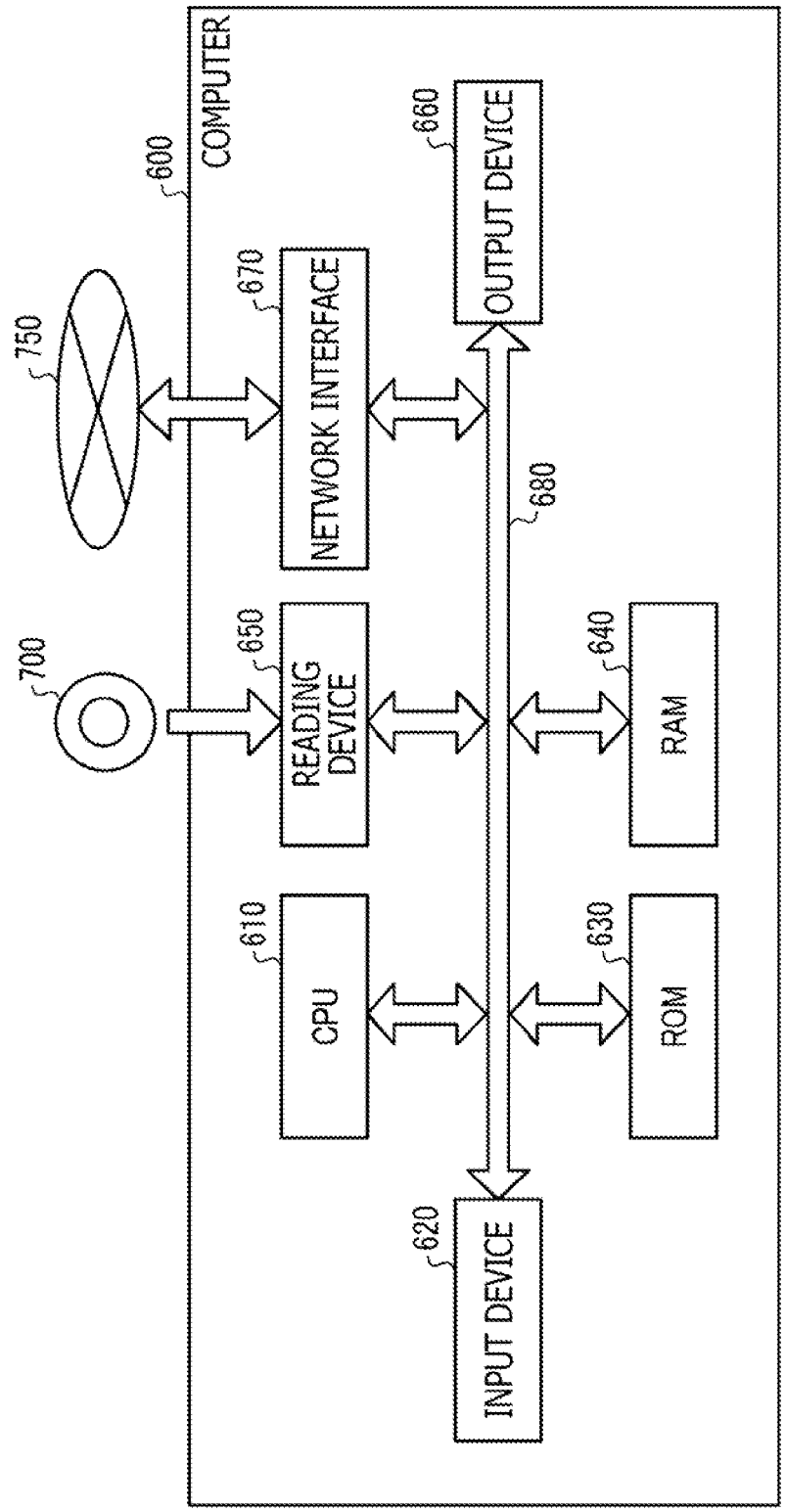
FIG. 18 illustrates an example hardware configuration of a computer.
Figure 19:
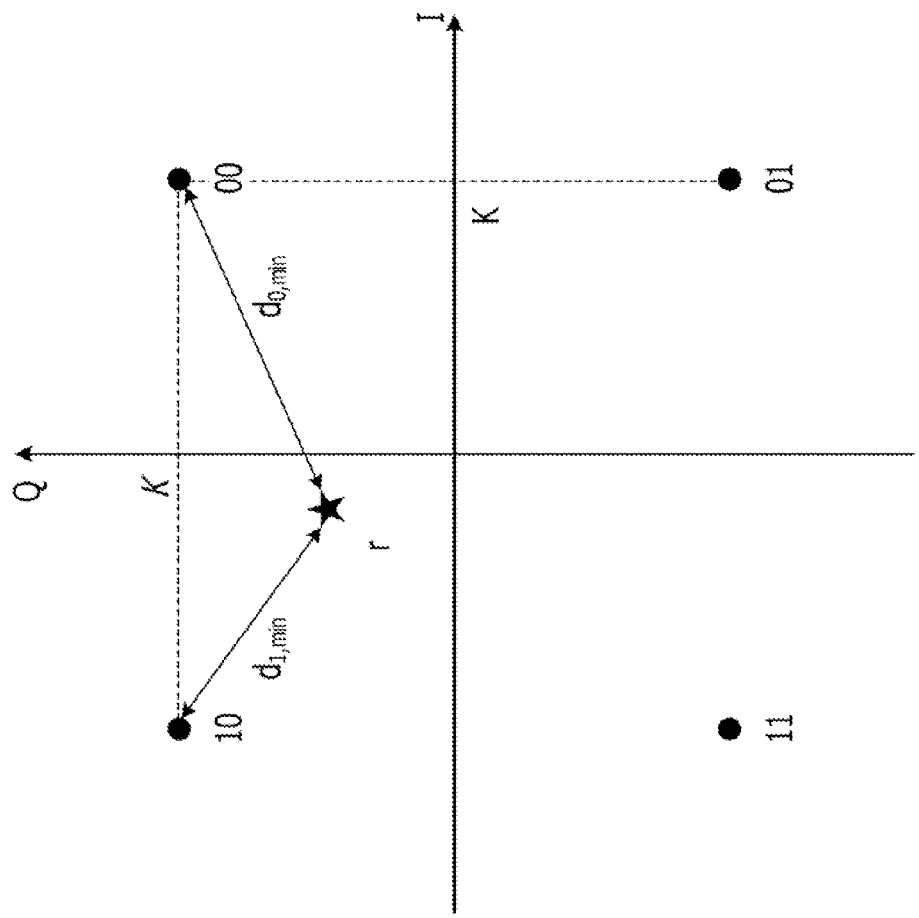
FIG. 19 is a diagram for explaining a bit log likelihood ratio.
Figure 20:
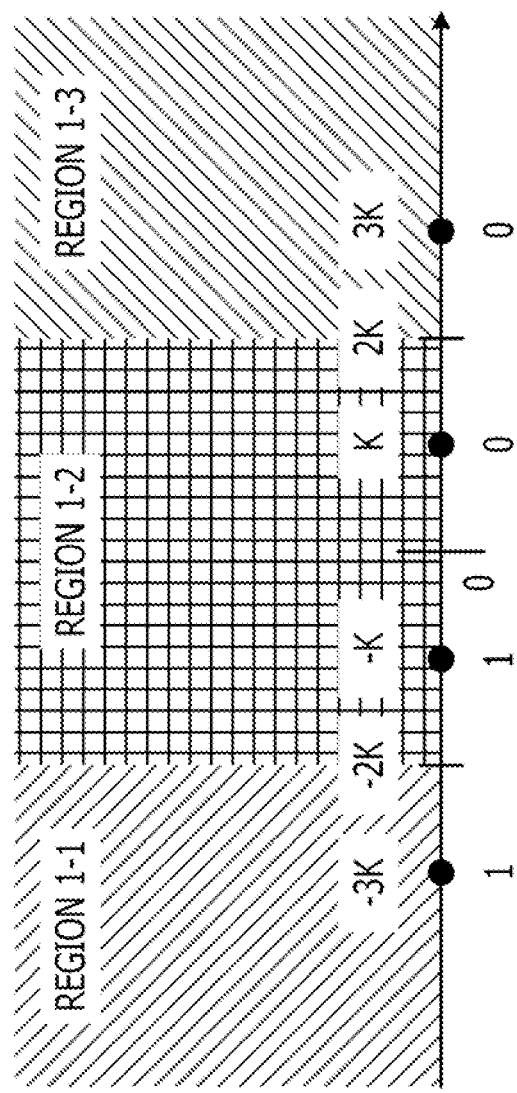
FIG. 20 is a diagram for explaining a bit log likelihood ratio for the first bit.
Figure 21:
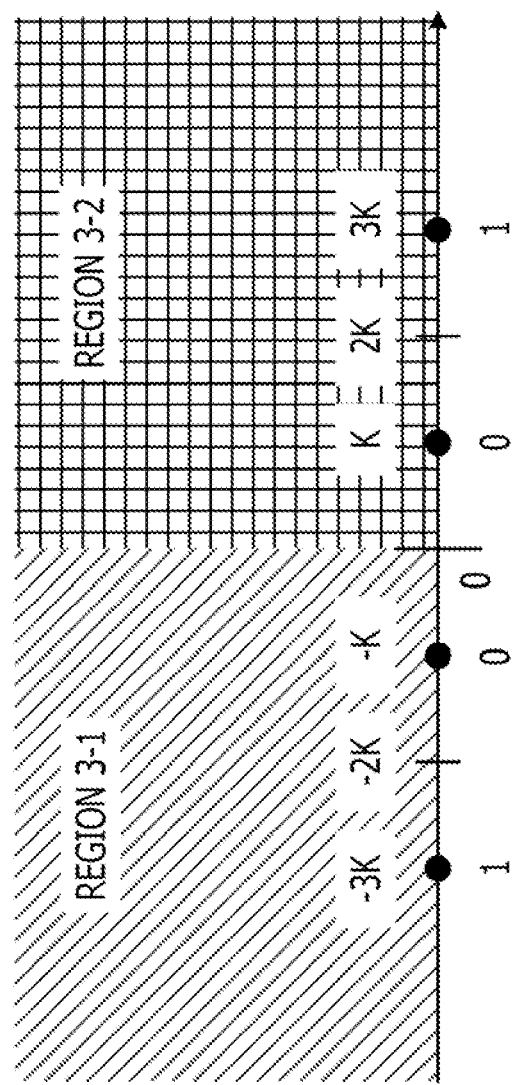
FIG. 21 is a diagram for explaining a bit log likelihood ratio for the third bit.

FIG. 18 is a block diagram illustrating a hardware configuration of a computer 600 that realizes error correction processing. As illustrated in FIG. 18, the computer 600 includes a central processing unit (CPU) 610 that executes the program described above, an input device 620 that inputs data, a read-only memory (ROM) 630 that stores various kinds of data, a random-access memory (RAM) 640 that stores operation parameters, a reading device 650 that reads a program from a recording medium 700 in which programs for realizing error correction processing are recorded, an output device 660, for example a display, and a network interface 670 that transmits and receives data to and from other computers through a network 750. These components of the computer 600 are connected through a bus 680.

The CPU 610 realizes error correction processing by reading a program recorded in the recording medium 700 through the reading device 650, and executing the read program. Examples of the recording medium 700 include an optical disk, a flexible disk, a compact-disk read-only memory (CD-ROM), and a hard disk. The program may be introduced into the computer 600 through the network 750, which may either be a wireless or wired network.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present invention(s) has(have) been described in detail, it should be understood that the various changes, substitutions, and alterations could be made hereto without departing from the spirit and scope of the invention.

The invention claimed is:

1. A radio communication apparatus comprising:
   a receiver configured to receive signals;
   a processor coupled to the receiver, configured to:
   obtain a reference amplitude that depends on a modulation scheme for a received signal received by the receiver, and on amplitude fluctuations of the received signal in a propagation path;
   perform demodulation of the received signal to obtain an in-phase component and a quadrature component of each received symbol included in the received signal;
   calculate a likelihood ratio for each of bits mapped to each received symbol using the reference amplitude and the in-phase or quadrature component, by at least one of:
      applying an operation expression including an absolute value operation to the reference amplitude and the in-phase or quadrature component of the received symbol,
      applying an operation expression including an absolute value operation to the reference amplitude and the in-phase or quadrature component of the received symbol, and
      applying a first-likelihood-ratio calculating to apply, to the reference amplitude and the in-phase component of the received symbol, an operation expression corresponding to the first bit mapped to the received symbol to calculate a likelihood ratio for the first bit, and a second-likelihood-ratio calculating to apply, to the reference amplitude and the quadrature component of the received symbol, the operation expression applied to the first-likelihood-ratio calculating to calculate a likelihood ratio for the second bit paired with the first bit; and
   perform error correction decoding on the received signal using the calculated likelihood ratios.

2. The radio communication apparatus according to claim 1, wherein
   the operation expression including the absolute value operation performs an addition or a subtraction depending on the sign obtained by the sign obtaining function.

3. The radio communication apparatus according to claim 1, wherein
   the processor is further configured to simultaneously calculate likelihood ratios for a plurality of received symbols obtained by the demodulation of the received signal.

4. The radio communication apparatus according to claim 1, wherein
   the processor is further configured to:
   determine, from the received signal, a channel estimate corresponding to phase fluctuations and amplitude fluctuations in the propagation path; and
   calculate the reference amplitude from the channel estimate and a coefficient that depends on the modulation scheme for the received signal.

5. A radio communication system comprising:
   a transmitting apparatus configured to radio-transmit signals; and
   a receiving apparatus configured to:
   receive signals radio-transmitted from the transmitting apparatus;
   obtain a reference amplitude that depends on a modulation scheme for a received signal received by the receiving apparatus, and on amplitude fluctuations of the received signal in a propagation path;
   demodulate the received signal to obtain an in-phase component and a quadrature component of each received symbol included in the received signal;
   calculate a likelihood ratio for each of bits mapped to each received symbol using the reference amplitude and the in-phase or quadrature component, by at least one of:
      applying an operation expression including an absolute value operation to the reference amplitude and the in-phase or quadrature component of the received symbol,
      applying an operation expression including an absolute value operation to the reference amplitude and the in-phase or quadrature component of the received symbol, and
      applying a first-likelihood-ratio calculating to apply, to the reference amplitude and the in-phase component of the received symbol, an operation expression corresponding to the first bit mapped to the received symbol to calculate a likelihood ratio for the first bit, and a second-likelihood-ratio calculating to apply, to the reference amplitude and the quadrature component of the received symbol, the operation expression applied to the first-likelihood-ratio calculating to calculate a likelihood ratio for the second bit paired with the first bit; and
   perform error correction decoding on the received signal using the calculated likelihood ratios.

6. The radio communication system according to claim 5, wherein
the transmitting apparatus is configured to:
perform error correction encoding on transmit data;
modulate the encoded data by mapping the encoded data to a symbol, the encoded data being obtained by the error correction encoding; and
radio-transmit the modulated data.

7. The radio communication system according to claim 5, wherein
the operation expression including the absolute value operation performs an addition or a subtraction depending on the sign obtained by the sign obtaining function.

8. The radio communication system according to claim 5, wherein
the receiving apparatus is further configured to simultaneously calculate likelihood ratios for a plurality of received symbols obtained by the demodulation of the received signal.

9. The radio communication system according to claim 5, wherein
the receiving apparatus is further configured to:
determine, from the received signal, a channel estimate corresponding to phase fluctuations and amplitude fluctuations in the propagation path; and
calculate the reference amplitude from the channel estimate and a coefficient that depends on the modulation scheme for the received signal.

10. An error correcting method comprising:
receiving a signal;
obtaining a reference amplitude that depends on a modulation scheme for the received signal and on amplitude fluctuations of the received signal in a propagation path;
demodulating the received signal to obtain an in-phase component and a quadrature component of each received symbol included in the received signal;
calculating, with a processor, a likelihood ratio for each of bits mapped to each received symbol using the reference amplitude and the in-phase or quadrature component, by at least one of:
applying an operation expression including an absolute value operation to the reference amplitude and the in-phase or quadrature component of the received symbol,
applying an operation expression including an absolute value operation to the reference amplitude and the in-phase or quadrature component of the received symbol, and
applying a first-likelihood-ratio calculating to apply, to the reference amplitude and the in-phase component of the received symbol, an operation expression corresponding to the first bit mapped to the received symbol to calculate a likelihood ratio for the first bit, and a second-likelihood-ratio calculating to apply, to the reference amplitude and the quadrature component of the received symbol, the operation expression applied to the first-likelihood-ratio calculating to calculate a likelihood ratio for the second bit paired with the first bit; and
performing error correction decoding on the received signal using the calculated likelihood ratios.

11. The error correcting method according to claim 10, wherein
the operation expression including the absolute value operation performs an addition or a subtraction depending on the sign obtained by the sign obtaining function.

12. The error correcting method according to claim 10, wherein
the calculating includes simultaneously calculating likelihood ratios for a plurality of received symbols obtained by the demodulating.

13. The error correcting method according to claim 10, wherein
the obtaining includes:
determining, from the received signal, a channel estimate corresponding to phase fluctuations and amplitude fluctuations in the propagation path; and
calculating the reference amplitude from the channel estimate and a coefficient that depends on the modulation scheme for the received signal.

* * * * *